US012539938B2

(12) United States Patent
Nelson

(10) Patent No.: US 12,539,938 B2
(45) Date of Patent: Feb. 3, 2026

(54) ELECTRIC BICYCLE CONVERSION KITS

(71) Applicant: BikeFin eBike Inc., Calgary (CA)

(72) Inventor: Liam Nelson, Calgary (CA)

(73) Assignee: BIKEFIN EBIKE INC., Calgary (CA)

( * ) Notice: Subject to any disclaimer, the term of this patent is extended or adjusted under 35 U.S.C. 154(b) by 879 days.

(21) Appl. No.: 17/698,907

(22) Filed: Mar. 18, 2022

(65) Prior Publication Data

US 2022/0297794 A1 Sep. 22, 2022

Related U.S. Application Data

(60) Provisional application No. 63/163,038, filed on Mar. 18, 2021.

(51) Int. Cl.
  *B62M 6/70* (2010.01)
  *B62M 9/00* (2006.01)
  *B62M 13/00* (2010.01)

(52) U.S. Cl.
  CPC ............ *B62M 6/70* (2013.01); *B62M 9/00* (2013.01); *B62M 13/00* (2013.01)

(58) Field of Classification Search
  CPC .......... B62M 6/70; B62M 9/00; B62M 13/00; B62M 6/45; B62M 6/90; B62M 6/55; B62K 2204/00
  See application file for complete search history.

(56) References Cited

U.S. PATENT DOCUMENTS

| | | | |
|---|---|---|---|
| 7,066,856 B1 | 6/2006 | Rogers | |
| 10,099,739 B2 | 10/2018 | Nishikawa | |
| 11,603,165 B2 * | 3/2023 | Ragland | B62M 6/40 |
| 11,654,994 B2 * | 5/2023 | Ragland | B62M 6/70 |
| | | | 180/220 |
| 2003/0056294 A1 * | 3/2003 | Ostor | B25B 27/0071 |
| | | | 7/138 |
| 2005/0077096 A1 * | 4/2005 | Kokatsu | B62M 6/45 |
| | | | 180/207.1 |
| 2016/0339992 A1 | 11/2016 | Yoshiie et al. | |
| 2017/0029057 A1 * | 2/2017 | Kato | B62J 6/16 |

(Continued)

OTHER PUBLICATIONS

Official Action for U.S. Appl. No. 17/855,455 dated Oct. 10, 2025, 8 pages.

*Primary Examiner* — Valentin Neacsu
*Assistant Examiner* — Marlon A Arce
(74) *Attorney, Agent, or Firm* — Sheridan Ross P.C.

(57) ABSTRACT

A kit of parts for converting a regular bicycle into an e-bike. The kit includes (i) an electric motive power unit having an external freewheeling sprocket drive assembly configured for demountable engagement with the bike's chain, (ii) a rechargeable battery and battery mount for providing electric power to the electric motive power unit, (iii) a mount bracket for demountably engaging therein the electric motive power unit and for demountably engaging there onto the battery mount, (iv) a power cable with an on/off switch and a demountable handlebar clamp for communication with the electric motive power unit, (v) a throttle control assembly configured for demountable engagement with the bike's handlebar; and (vi) a communication cable engagement with the throttle control assembly and the electric motive power unit and optionally, with a wheel sensor. The kit may additionally comprise a battery charger.

21 Claims, 25 Drawing Sheets

(56) References Cited

U.S. PATENT DOCUMENTS

2018/0012513 A1\* 1/2018 Hu .......................... G09B 1/00
2018/0244342 A1\* 8/2018 Macmartin ........... B60W 10/08
2019/0202520 A1\* 7/2019 Yap ..................... B62K 15/006
2022/0281555 A1\* 9/2022 Ragland ................ B62K 19/34

\* cited by examiner

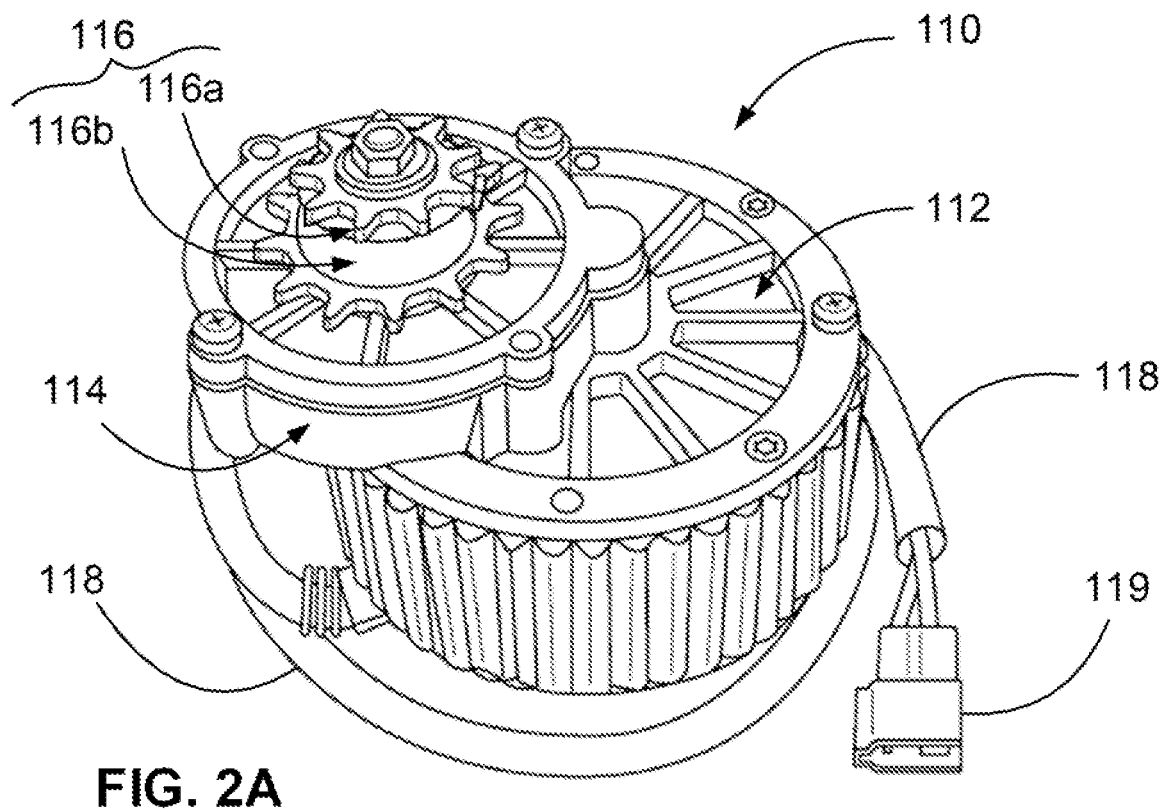
FIG. 2A
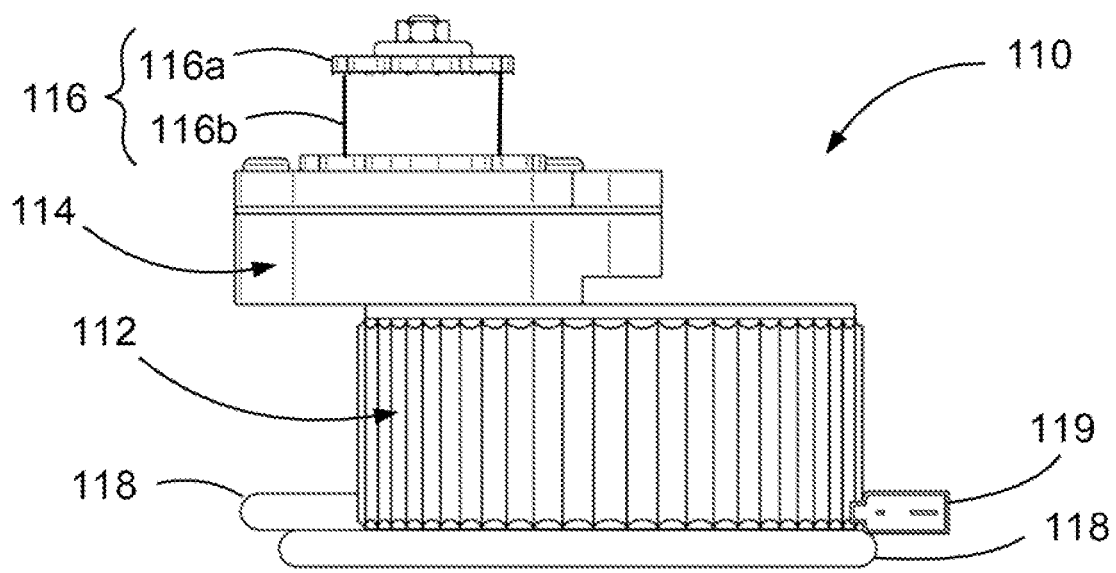
FIG. 2B
FIG. 2

FIG. 4A
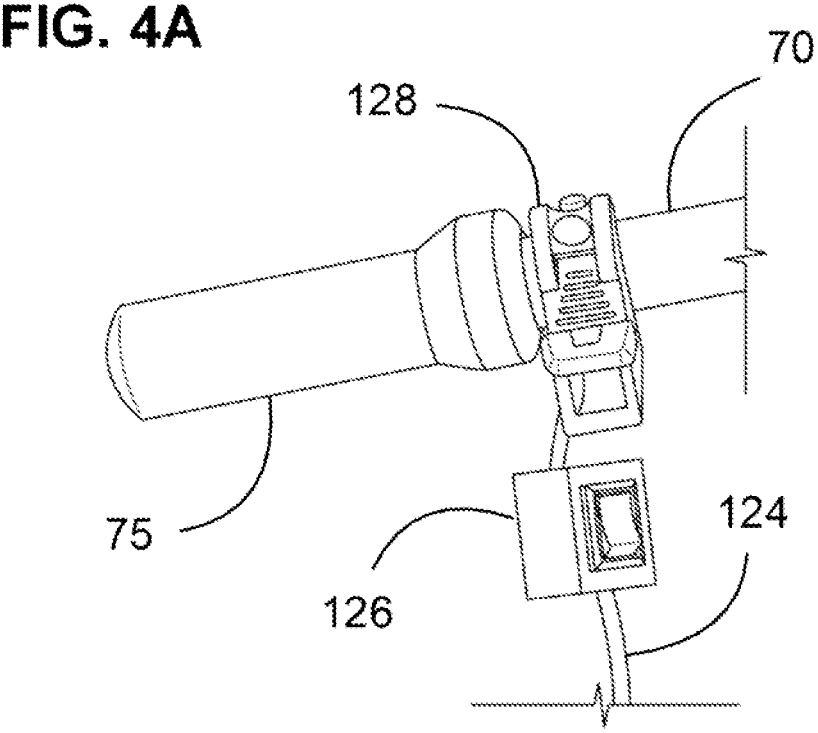
FIG. 4B
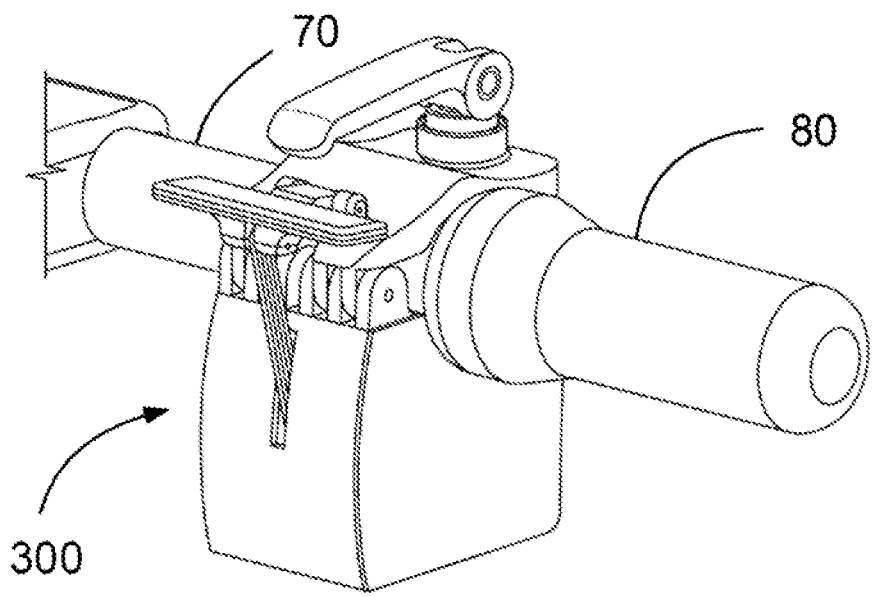
FIG. 4

FIG. 15A
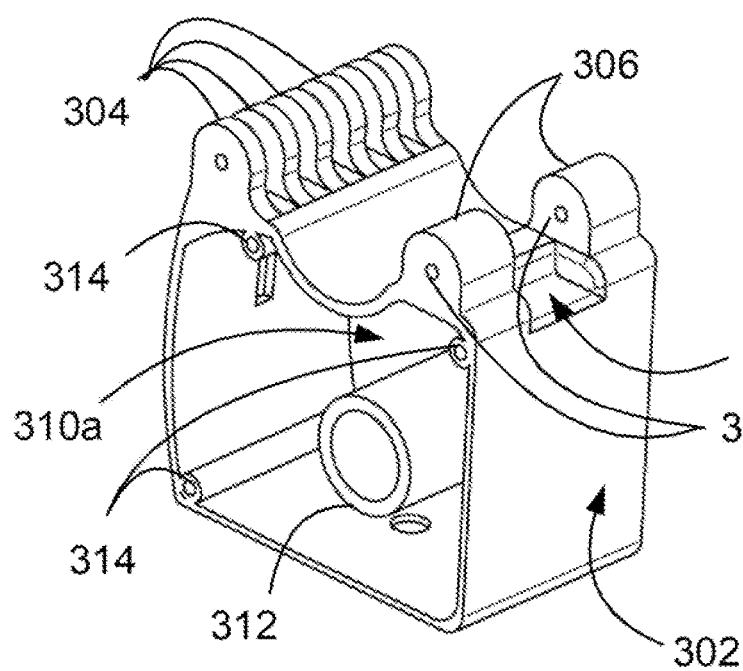
FIG. 15B
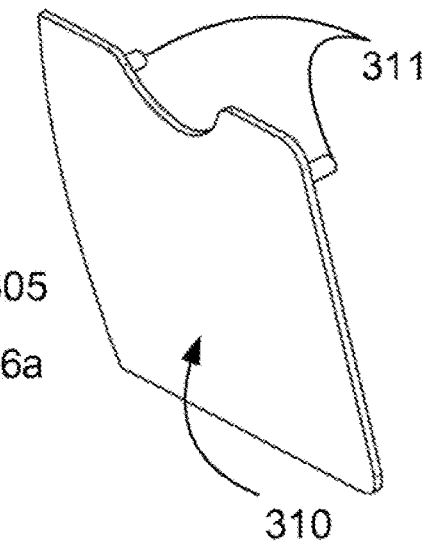
FIG. 15C
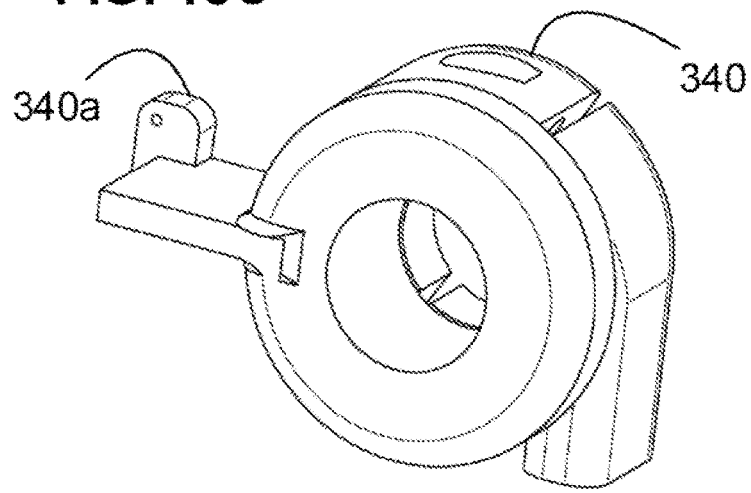
FIG. 15

FIG. 16A
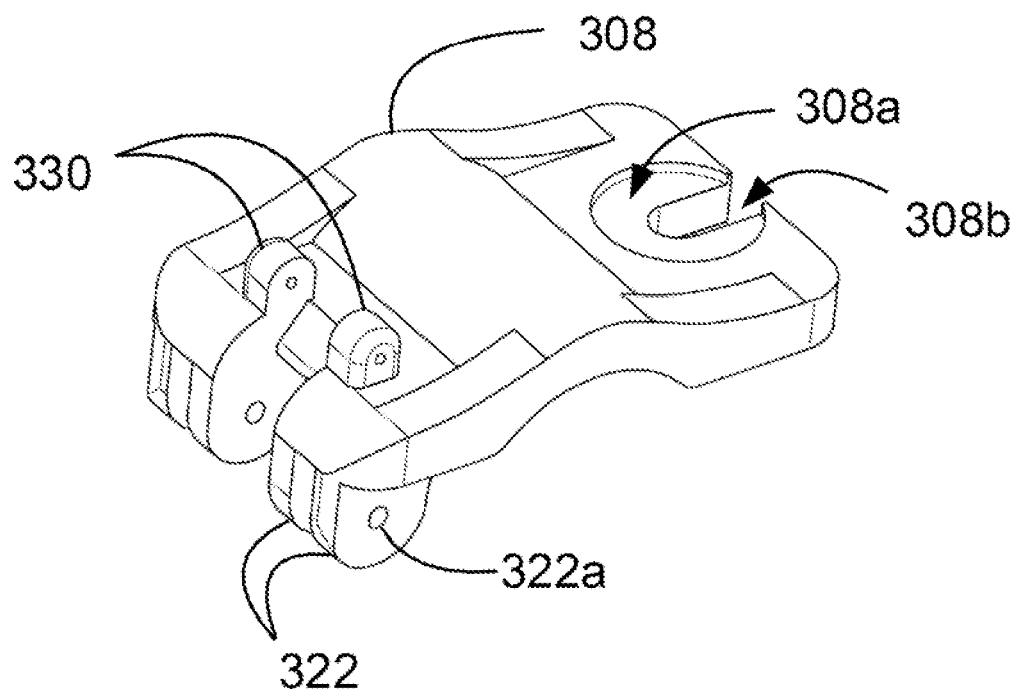
FIG. 16B
FIG. 16C
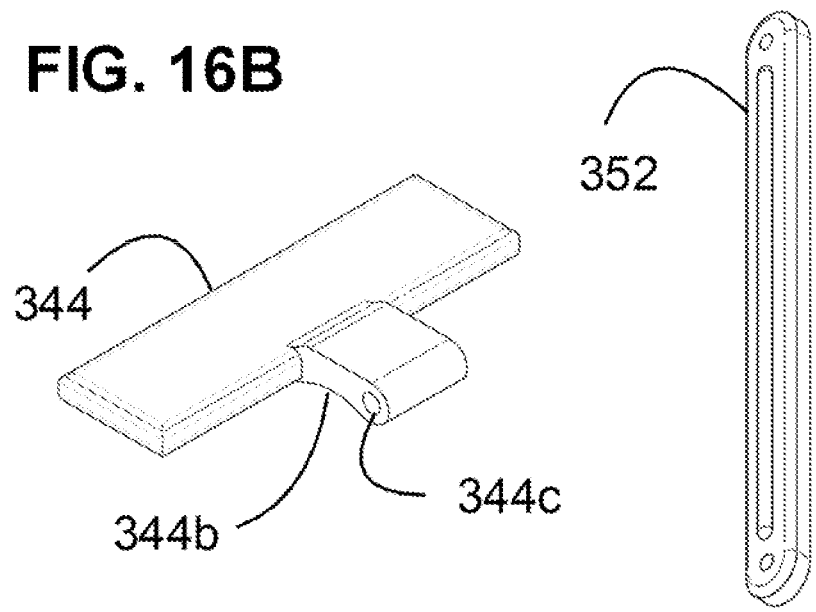
FIG. 16

FIG. 17A
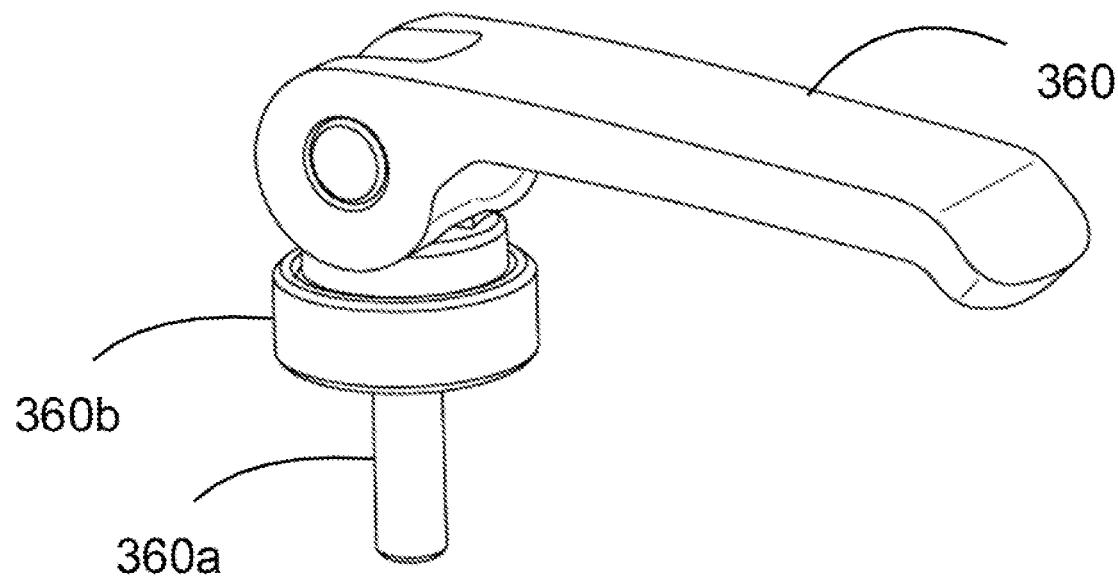
FIG. 17B
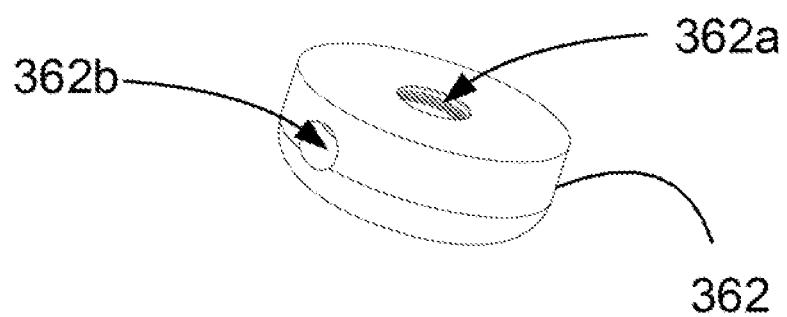
FIG. 17

FIG. 20A
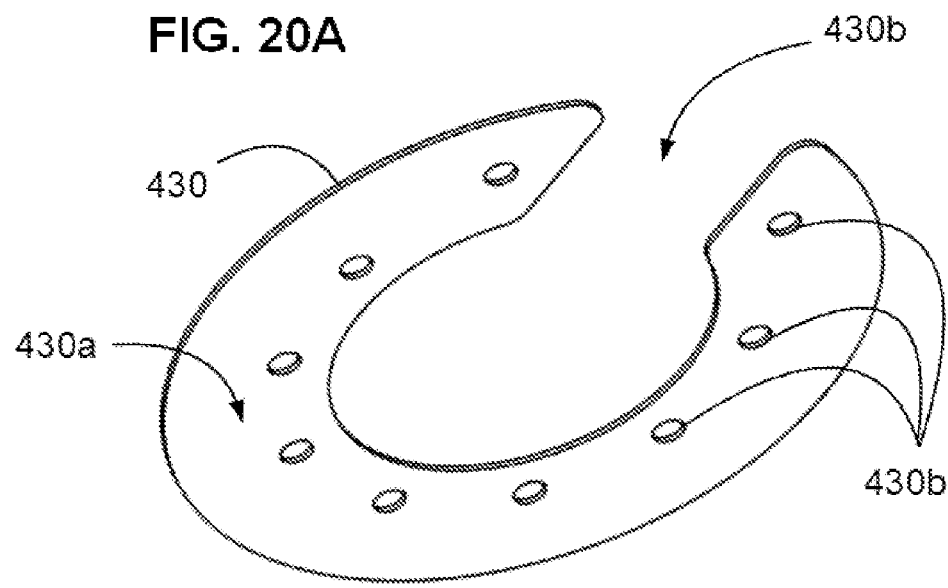
FIG. 20B
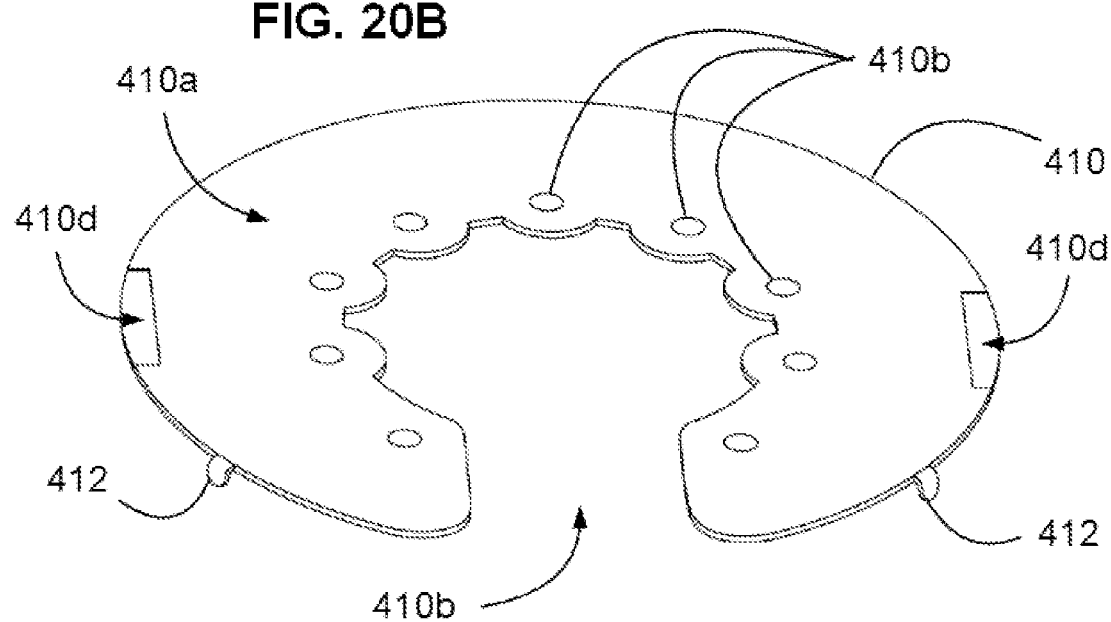
FIG. 20

FIG. 22A
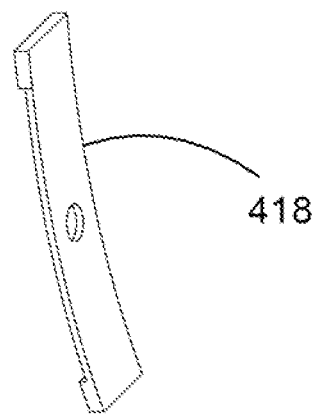
418
FIG. 22B
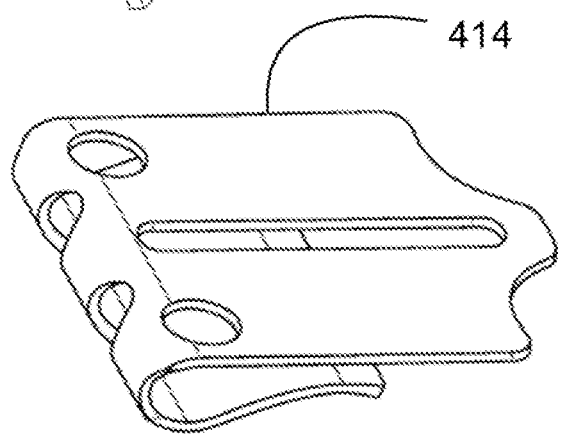
414
FIG. 22C
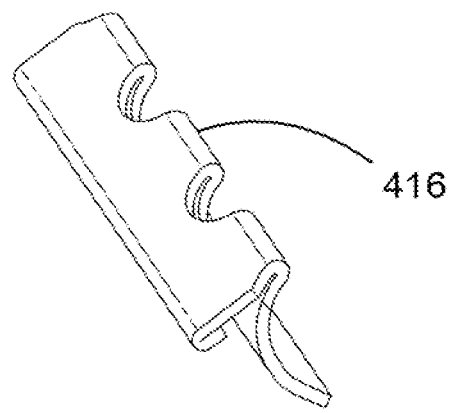
416
FIG. 22

ELECTRIC BICYCLE CONVERSION KITS

CROSS REFERENCE TO RELATED APPLICATIONS

This application claims priority to U.S. Provisional Patent Application Ser. No. 63/163,038, filed Mar. 18, 2021, the entire disclosure of which is hereby expressly incorporated by reference in its entirety.

TECHNICAL FIELD

The invention relates generally to the field of electric bicycles and, more particularly, to kits of parts for converting regular bicycles into e-bikes.

BACKGROUND

Electric bicycles, also commonly referred to as "e-bikes", have become readily available and popular in recent years. Adding battery-assisted power to a rider's pedaling power may increase the distances the rider may travel, shorten the time required to pedal from one location to another, reduce the rider's fatigue, and increase enjoyment of the bicycling experience. However, electric bicycles manufactured commercially for public sales are expensive and may be cost-prohibitive for many consumers.

Consequently, numerous kits comprising batteries and battery-powered motors, are becoming available for retro-fitting regular types of bicycles to convert them into e-bikes. Use of such e-bike conversion kits typically require specialized tools and knowledge of working on bikes and/or bike systems. Even then, adapting and fitting such kits to regular bikes may be relatively difficult and time-consuming. These kits may require replacement of certain bicycle parts such as, for example, front pedal assemblies, gear assemblies, and wheels. Some prior art e-bike conversion kits may require bypassing and/or removing a bike's front pedal and/or sprocket assembly, in relatively complex ways.

Many prior art e-bike conversion kits have components that may be bulky and heavy relative to the weight of a regular bicycle that when installed, cause an unbalanced weight distribution when in use by a cyclist thereby creating directional control and balance issues, and other safety concerns Prior art devices that fail to bypass a bike's pedal system may be especially bulky and require replacement of the bike's pedal and front sprocket assembly in order to provide mid-drive functionality whereby an electric motor can engage directly with a bike's chain and provide variable-speed transmission. They may have involved removing a bike's front wheel or rear wheel; and/or major modifications to the bike's rear sprocket assembly. Prior art e-bike conversion kits may have been insufficiently compact and may have faded to provide one or more desired features and/or functionalities.

SUMMARY

The embodiments of the present disclosure generally relate to kits of parts, components of the kits and systems for converting regular bicycles into e-bikes wherein some of the motive power transmitted to their rear wheels is provided by electric power to the pedals by battery components of the kits of parts. Some embodiments pertain to components comprising the kits of parts. Such kits of parts may be referred to herein as e-bike conversion kits.

The e-bike conversion kits disclosed herein comprise components that enable quick and easy conversion of any common bicycle with a rear derailleur to mid-drive e-bike wherein an electric motive power unit may provide motive power to the bikes front sprocket assembly, and back again without the need for specialized tools or technical skills. Installation of an e-bike conversion kit disclosed herein does not require the removal of or modification of any of the regular bike's components. The present e-bike conversion kits comprise components that may be simply and easily demountably engaged with a bike's frame element, the front sprocket, and the handlebars. The kits of parts disclosed herein enable installation of a demountable mid-drive component that communicates and collaborates with the converted bicycle's rear derailleur gear assembly to provide a rider with a variable-speed motor transmission for responding to variable road conditions and inclines while riding.

For ease of reference hereinafter, regular bike frame assemblies generally comprise a seat tube element having a bottom bracket for demountable engagement therethrough with a front sprocket and pedal assembly, a head tube element configured for rotational engagement with a front fork element, a top tube element having one end engaged with the top of the seat tube element and its other end engaged with the top of the head tube element, a down tube element having one end engaged with the bottom of the seat tube element and its other end engaged with the bottom of the head tube element, a seat stay element with one end engaged with the top of the seat tube element and extending backward and downward therefrom and having a rear bracket at its other end for demountable engagement therethrough with a derailleur gear assembly, and a chain stay element engaged at one end with the bottom bracket of the seat tube element and engaged at its other end with the rear bracket of the seat stay element. A common feature that most regular bikes have is a pair of threaded bores provided on the upper-facing topside of the down tube element for demountable engagement therewith a water bottle cage.

According to an embodiment of the present disclosure, an example e-bike conversion kit may comprise a portable electric motive power unit, a motor mount bracket configured for demountable engagement with a regular bike's down tube element and for securely engaging the electric motive power unit therein a portion of the motor mount bracket, a battery mount bracket configured for demountable engagement with a top portion of the motor mount bracket, a battery configured for demountable engagement with the battery mount bracket, an on/off switch demountable with the bike's handlebar and in communication with the electric motive power unit, and a quick-release throttle lever assembly configured for demountable engagement with the bike's handlebar and in communication with the electric motive power unit. According to one aspect, the e-bike conversion kit may additionally comprise a battery charging component. According to another aspect, the e-bike conversion kit may additionally comprise a bearing ring assembly configured for demountable engagement with the bike's front sprocket assembly.

According to an embodiment, the electric motive power unit may comprise a battery-powered electric motor within a housing, a set of drive gears housed within a housing, and an external freewheeling sprocket gear assembly in communication with the set of drive gears. According to an aspect, the gear housing may be directly bolted to the electric motor housing so that the driveshaft of the motor is in communication with the gear assembly. According to an aspect, the outermost sprocket of the external freewheeling sprocket assembly preferably has eight or nine teeth for communication and cooperation with the sprocket gears of a rear derailleur gear assembly on a common regular bicycle. It is to be noted that it is preferable that the outermost sprocket gear of the external freewheeling sprocket assembly has eight or nine teeth in order to provide the necessary mechanical advantage to work with a bike's existing sprocket gears in its rear derailleur to thereby enable lower electric power motors such as 250 W motors, to provide electric motive power to a regular bike. A smaller sprocket tooth count also serves to lower the amount of torque/pulling force that the bracket and bike downtube must handle. Freewheeling sprocket gears having only eight or nine teeth do not currently exist on the market for bicycles and can only be made by special modification to 12-tooth freewheel sprocket gears by welding the 8 or 9 tooth sprocket gears onto the end of 12-tooth freewheel sprockets. According to an aspect, the external sprocket assembly may comprise an outer sprocket gear and inner sprocket gear, said outer sprocket gear and inner sprocket gear separated and spaced-apart by a cylindrical roller.

According to another embodiment, the motor mount bracket may be configured for (a) receiving and demountable engagement of the electric motive power unit therein whereby the external sprocket assembly extending outward from the electric motive power unit is disposed sideways from an end of the motor mount bracket, and (b) demountable engagement with the spaced-apart pair of threaded bores provided on the topside a regular bike's down tube element approximate to the bottom bracket of a bike's frame assembly. When a motor mount bracket engaged with an electric motive power unit, is demountably engaged with a regular bike's down tube element, the outward-extending sprocket assembly of the electric motive power unit is preferably disposed below and in front of the bike's front sprocket assembly to allow the bike's chain 60 to wrap sufficiently around the bike's front sprocket to prevent chain slip if a rider pedals without the electric motive power. According to an aspect, the motor mount bracket may be adjustably engaged with the bike's down tube element so that the outward-extending sprocket of the electric motive power unit preferably is disposed below and in front of the bike's front sprocket assembly. According to another aspect, after the motor mount bracket is demountably engaged with the bike's down tube element, the battery mount bracket may be demountably engaged with the top portion of the motor mount after which, the battery may be demountably engaged with the battery mount bracket.

According to another embodiment, after a motor mount bracket demountably engaged with an electric motive power unit, is demountably engaged with regular bike's down tube element, the motor mount bracket may be twistingly adjusted around the bike's down tube element with bracing and clamping mounting screws/bolts so that (i) the outermost sprocket gear of the outward-extending sprocket assembly of the electric motive power unit is linearly aligned with the outermost sprocket gear of the bike's front sprocket assembly, and optionally (ii) the cylindrical roller of the outward-extending sprocket assembly of the electric motive power unit is linearly aligned with the middle sprocket gear of the bike's front sprocket assembly.

According to an aspect of the invention, the e-bike conversion kits of parts disclosed herein may provide three different ways of riding a e-bike converted with an e-bike conversion kit: (i) as a bike only without engaging the battery-powered motor whereby the only motive force provided is by a rider's pedaling of the front sprocket assembly, (ii) in a pedal-assist mode whereby supplemental motive is provided by the battery-powered motor in response to the rider controlling engagement of the throttle lever assembly selectively rest their feet on the bicycle pedals and/or to pedal the front sprocket to provide additional motive power, and/or (iii) as a full e-bike wherein all of the motive power is provided by the battery-powered motor with no pedaling required by the rider.

BRIEF DESCRIPTION OF THE DRAWINGS

The novel features believed to be characteristic of the kit and system, and method according to the present invention, as to their structure, organization, use, and method of operation, together with further objectives and advantages thereof, will be better understood from the following figures in which one or more presently preferred embodiments of the invention will now be illustrated by way of example.

FIG. 2 is a perspective view (FIG. 2A) of an example electric motive power component of an embodiment of the e-bike conversion kits of parts disclosed herein, while FIG. 2B is a side view of the electric motive power component shown in FIG. 2A;

FIG. 4 shows an example off/on switch according to an embodiment of the e-bike conversion kit of parts disclosed herein, demountably engaged with a left side of a handlebar of a regular bicycle (FIG. 4A), and an example throttle control assembly according to another embodiment of the e-bike conversion kit of parts disclosed herein, demountably engaged with the right side of the handlebar (FIG. 4B);

FIG. 15 shows front perspective views of (i) the throttle base of the throttle control assembly shown in FIGS. 12, 13, and 14 (FIG. 15A), (ii) the throttle base left side cover (FIG. 15B), and (iii) a tubular mount member extending from the inside of the throttle base right side cover (FIG. 15C);

FIG. 16 shows perspective views of the throttle control assembly shown in FIG. 16 wherein FIG. 16A shows the throttle top, FIG. 16B shows the thumb throttle control, and FIG. 16C shows the throttle shaft;

FIG. 17 shows an example quick-release cam lever (FIG. 17A) and an example quick-release nut configured for cooperation with the quick-release cam lever (FIG. 17B);

FIG. 20 shows a perspective view of the topside of a sprocket connection plate shown in FIG. 19 (FIG. 20A), and a perspective view of the bottom side of a bearing cover plate shown in FIG. 19 (FIG. 20B);

FIG. 22 are perspective views of the bearing clip component shown in FIG. 18 (FIG. 22A), the clip for attaching the sprocket connection plate to a bicycle front socket assembly (FIG. 22B), and the clip pull tab (FIG. 22C);

DETAILED DESCRIPTION

Figure 1:
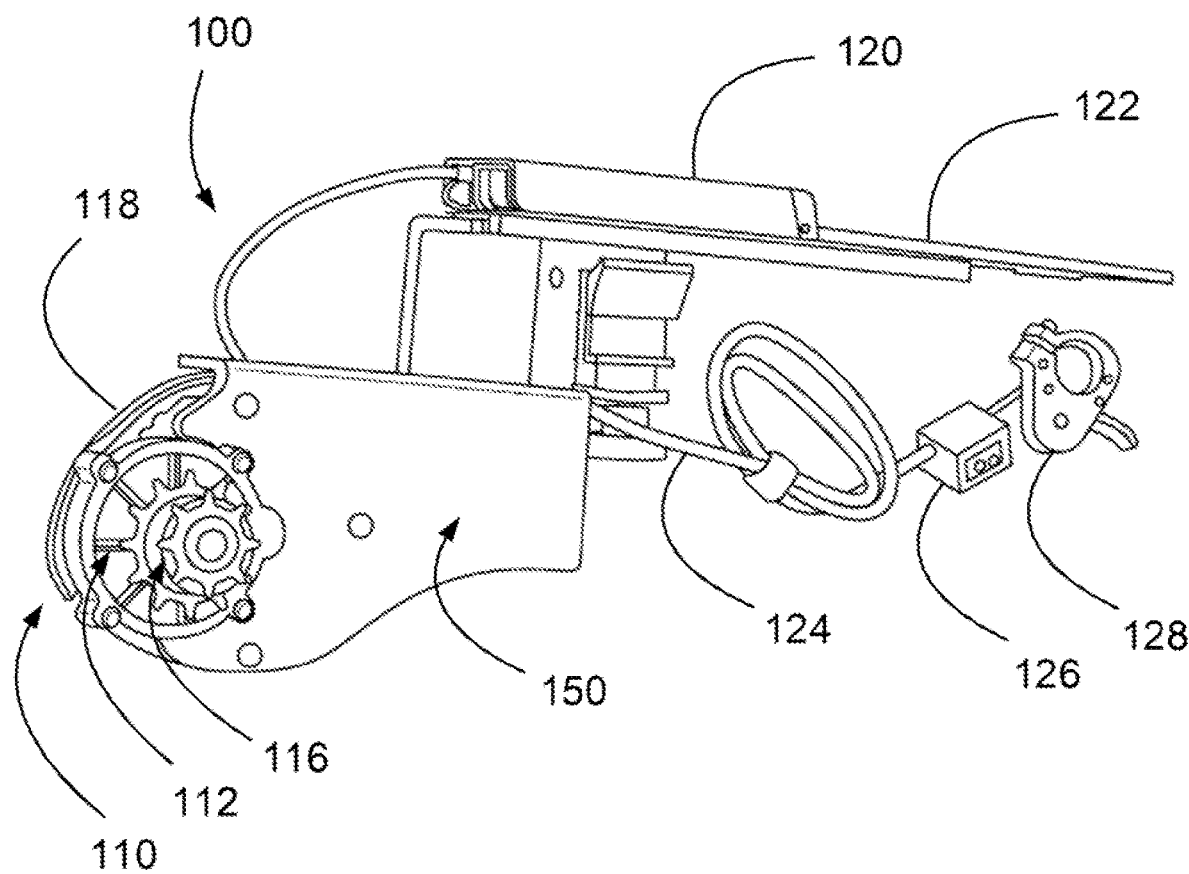
FIG. 1 is side view of some example embodiments of assembled components comprising e-bike conversion kits of parts disclosed herein for providing electric motive power to regular bicycles, wherein the assembled components comprise an electric motive power component demountable engaged with the base of a one-piece motor mount and a battery pack component demountably engaged with the top if the one-piece motor mount.

The present disclosure relates to e-bike conversion kits of parts for quick and easy conversion of common and regular bicycles into e-bikes wherein some or all of the motive power is provided by a battery-powered electric motive power unit included with the kits of parts. The components comprising the e-bike conversion kits of parts do not require technical skills for their mounting and installation onto common and regular bicycles (referred to herein after as "bikes", and may be easily installed onto a bike's down tube frame element, front sprocket assembly, and handlebars. No modifications of regular and common bicycles are needed, and no bicycle components need to be removed for installation of the e-bike conversion kits of parts disclosed herein.

Some example embodiments of the present e-bike conversion kits of parts 100 are illustrated in FIGS. 1 to 16, and generally comprise an electric motive power unit 110, a one-piece mount bracket 150, for the electric motive power unit 110, a battery pack comprising a rechargeable battery 120, a battery mount bracket 122 that is demountably engageable with a top portion of the one-piece mount bracket 150, an on/off switch 126 for controllably turning the electric motive power unit 110, and a quick-release throttle assembly 300 demountable with a handlebar 70 without need for removal of handlebar grips 75, 80, for controlling the amount of electric motive power that is delivered by the electric motive power unit 110 to a bike's front sprocket assembly 55. An optional component that may be included with e-bike conversion kits of parts 100 is a battery charger (not shown) for recharging the battery after the electric motive power unit 110 has been used to provide electric motive power to a converted e-bike after it has been ridden.

For ease of reference hereinafter, regular bike frame assemblies generally comprise a seat tube element 20 having a bottom bracket for demountable engagement therethrough with pedals 50 and a front sprocket assembly 55, a head tube element configured for rotational engagement with a front fork element, a top tube element having one end engaged with the top of the seat tube element and its other end engaged with the top of the head tube element, a down tube element 30 having one end engaged with the bottom of the seat tube element 20 and its other end engaged with the bottom of the head tube element, a seat stay element with one end engaged with the top of the seat tube element and extending backward and downward therefrom and having a rear bracket at its other end for demountable engagement therethrough with a derailleur gear assembly, and a chain stay element 35 engaged at one end with the bottom bracket of the seat tube element and engaged at its other end with the rear bracket of the seat stay element 20. A common feature that most regular bikes have is a pair of threaded bores provided on the upper-facing topside of the down tube element for demountable engagement therewith a water bottle cage.

An example of a suitable electric motive power unit 110 is illustrated in FIGS. 1, 2A, and 2B and in this example, includes a battery-powered motor 112 within a housing, a gear assembly 114 within a housing, an external outward-facing freewheeling sprocket assembly 116, a power cord 118 connected at one end to the battery-powered motor 112 and provided with a terminal 119 at its other end, wherein the terminal 119 is demountably engageable with a socket 122a provided therefor on the battery mount bracket 122. Suitable electric motors for use in the electric motive power units disclosed herein included brushed DC electric motors and brushless DC electric motors (also commonly referred to as BLDC motors). As illustrated in FIGS. 2A and 2B, the housing for gear assembly 114 may be directly mounted onto and secured to the housing for the battery-powered motor 112 whereby the battery-powered driveshaft may be directly engaged with one end of the gear assembly 114. The other end of the gear assembly 114 is directly engaged with the external outward-facing freewheeling two-stage sprocket assembly 116. The freewheeling two-stage sprocket assembly 116 includes an outermost sprocket gear 116a and an idler roller 116b interposed the outermost sprocket gear 116a and the gear housing 114. It is to be noted that freewheeling two-stage sprocket assembly 116 allows a rider to provide motive power by pedaling when the electric motive power unit 110 is turned off. When the electric motive power unit is turned out, the freewheeling two-stage sprocket assembly 116 will provide electric motive power to the bicycle chain to assist with the rider's pedaling.

Figure 3:
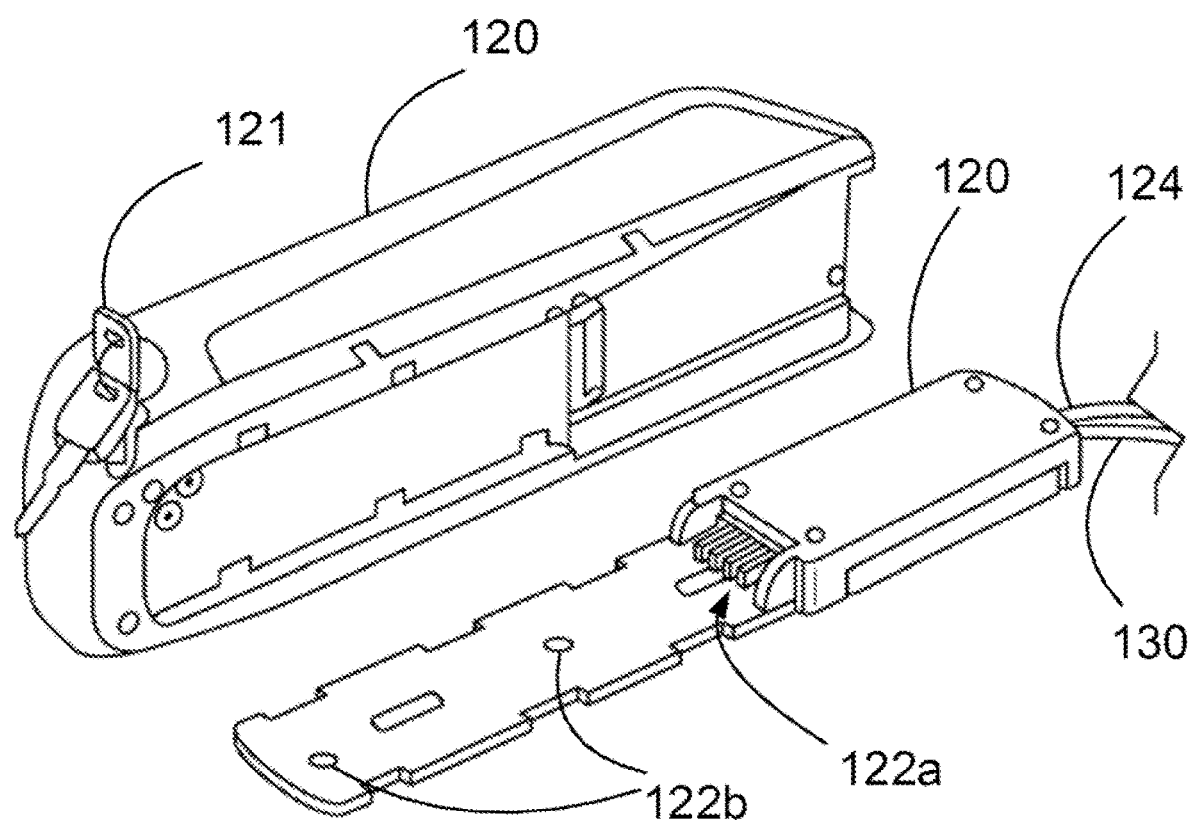
FIG. 3 is an exploded perspective view of an example battery pack component of the e-bike conversion kits of parts disclosed herein.
Figure 5:
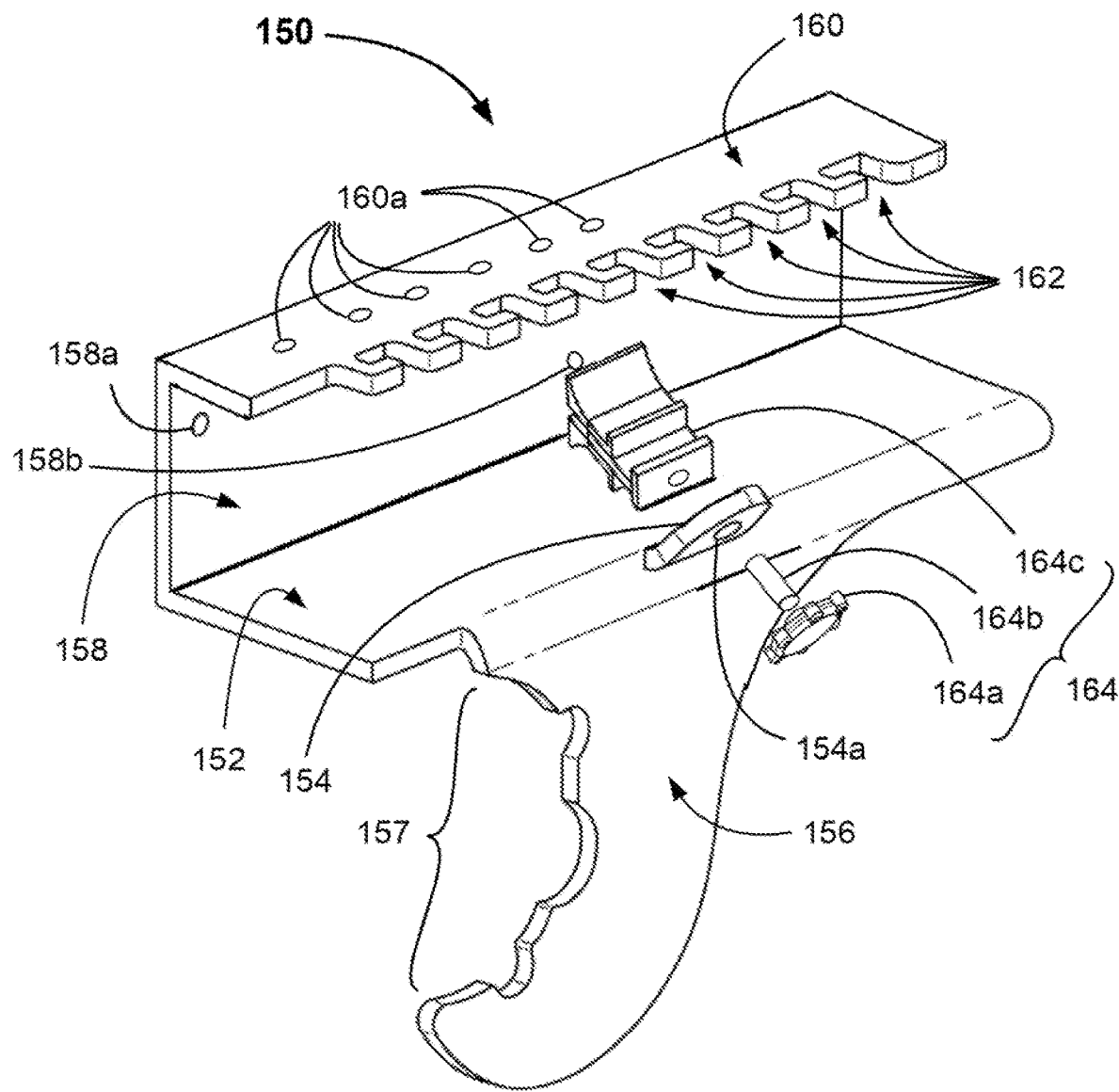
FIG. 5 is a perspective view of an example embodiment of a one-piece motor mount component of the e-bike conversion kits of parts disclosed herein.

An example of a suitable battery component is shown in FIG. 3 and comprises a rechargeable battery 120, and a battery mount bracket 122 configured demountable engagement with the rechargeable battery 120 and for demountable engagement with a one-piece mount bracket 150 configured for receiving and retaining therein the electromotive power unit 110 (FIG. 5). The battery mount bracket 122 is provided with a socket 122a for demountably receiving and engaging therewith the terminal 119 of the power cord 118 (FIG. 3). The battery mount bracket 122 is provided with a first power cord 124 having approximate to its distal end, an on/off switch 126 with a clamp 128 (FIG. 4A) for demountable engagement of the power cord to one side of the handlebar 70 of the regular bike onto which the components comprising the e-bike conversion kit of parts are being installed. The battery mount bracket 122 is provided with a second power cord 130 having at its distal end quick-release throttle control assembly 300 (FIG. 4B) that is configured for demountable engagement with a side of the handlebar of the regular bike onto which the components comprising the e-bike conversion kit of parts. The battery mount 122 may also be provided with two or more bores 122b for receiving screw bolts therethrough for engagement of the battery mount 122 with threaded bores 160a provided therefor in the top portion 160 of the mount bracket 150 (FIG. 5).

An example of a suitable mount bracket 150 for demountable engagement with an electric motive power unit 110 and a regular bike, is shown in FIG. 5. The example mount bracket 150 comprises a base portion 152, a downward extending side portion 156, an upward-extending side portion 158, and a top surface portion 160 that is parallel to the base portion 152. The rearward-facing edge of the downward extending side portion 156 is provided with an inward-facing profile 157 that corresponds with the outward-facing profile of the electric motive power unit 110 (FIG. 2), so that when the electric motive power unit 110 is mounted into the mount bracket 150 using a pair of motive power clamp assemblies 164 in threadable engagement with bore 158a provided in the upward-extending side portion 158, and bore 154a in yoke 154 provided extending upward from the base portion 152 opposite bore 158a, its two-stage sprocket assembly 116 is projecting rearward from the mount bracket 150 as illustrated in FIG. 1. It is to be noted that the motive power clamp assemblies 164 comprise a large clamp knob 164a that comfortably fits into a user's hand, an adjusting screw 164b rotationally engaged at one end with the clamp knob 164a and rotationally engaged at its other end with a wedge-shaped rubber clamp head 164c, to thereby apply a compressive force against an electric motive power unit 110 that is being installed into the mount bracket 150 whereby the a wedge-shaped rubber clamp head 164c.

Figure 6:
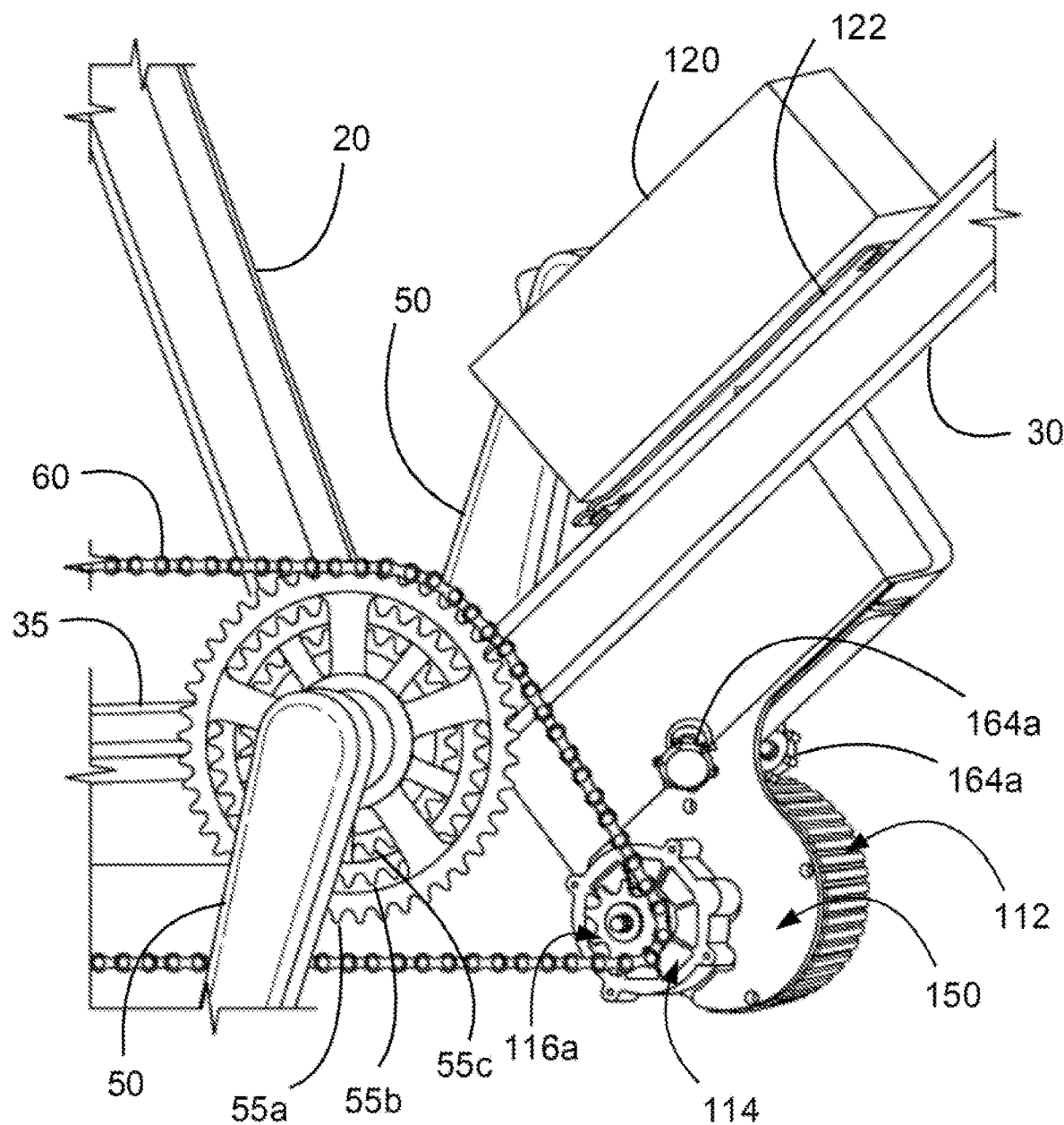
FIG. 6 is a perspective front view of the motor mount plate shown in FIG. 5, the electric motive power component shown in FIG. 2, and the battery pack component shown in FIG. 3, demountably engaged with a regular bicycle frame and the outermost sprocket gear of its front sprocket assembly.
Figure 7:
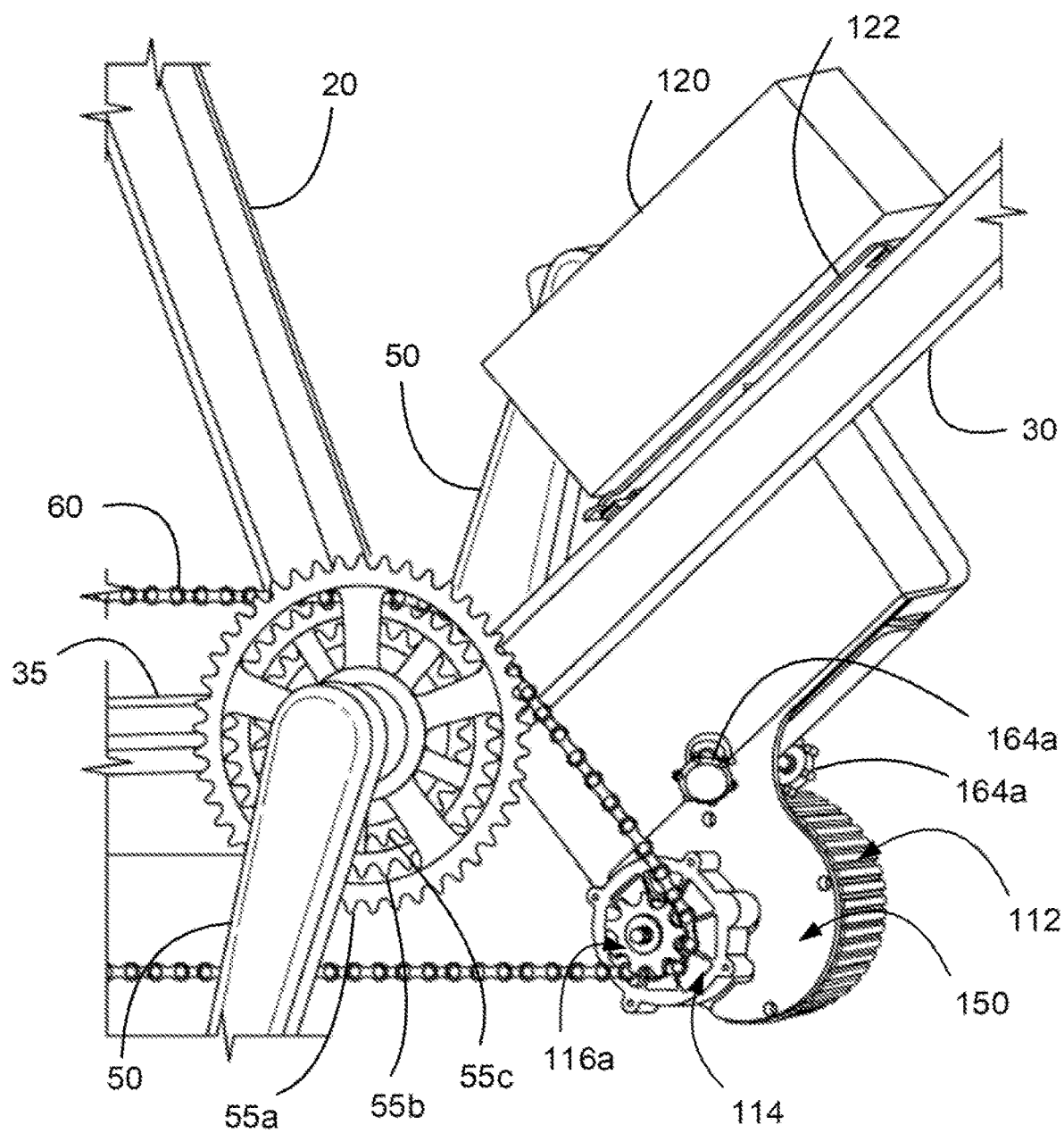
FIG. 7 is a second perspective front view of the motor mount plate shown in FIG. 5, the electric motive power component shown in FIG. 2, and the battery pack component shown in FIG. 3, demountably engaged with a regular bicycle frame and the middle sprocket gear of its front sprocket assembly.

The terminal side edge of the top surface portion 150 of the mount bracket 150 is provided with a plurality of equally spaced-apart hook-shaped slots 162. The mount bracket 150 may be demountably engaged with the topside of a regular bike's down tube element by inserting a pair of retaining hex head bolts (not shown) through a selected pair of hook-shaped slots 162 and then threadably engaging the spaced-apart pair of threaded bores provided on the topside of a regular bike's down tube element for demountable engagement with a water bottle cage (FIGS. 6, 7). It is to be noted that the positioning of the mount bracket 150 may be adjusted upward along the bike's down tube element by selecting a pair of hook-shaped slots 162 that are closer to the left-end edge of the mount bracket 150, and may be adjusted downward along the bike's down tube element by selecting a pair of hook-shaped slots 162 that are closer to the right-end edge of the mount bracket 150. It should be noted that a pair of slots 162 should be selected so that the outer front sprocket gear 116a is positioned such that the bicycle chain 60 is sufficiently wrapped around a bicycle's front sprocket gear 55a so that the chain 60 will not slip or jump the front sprocket teeth 55a if a rider is applying pedal force only without electric motive power. After the mount bracket 150 has been securely mounted to the bike's down tube element 30, the electric motive power unit 110 may be positioned within the mount bracket's base portion 152 and upward-extending side portion 158 so that its outer external sprocket gear 116a is aligned with the bike's outermost front sprocket gear 55a, and then secured in place by threadably engaging first and second clamping bolt assemblies 164 with bores 154a and 158a.

The battery mount bracket 122 may be secured to the top surface portion 160 of the mount bracket 150 by slipping two flat-head machine screws (not shown) through bores 122b provided therefore through the battery mount bracket 122 and threadably engaging the two threaded bores 160a in the top surface portion 160 of the one-piece mount bracket 150. After the rechargeable battery 120 is demountable engaged with the battery mount bracket 122, it may be locked into place with the battery key 121 thereby preventing disengagement of rechargeable battery 120 battery from the battery mount bracket 122, It is to be noted that when the rechargeable battery 120 battery is locked to the battery mount bracket 122, the machine screws securing the battery mount bracket to 122 to the top portion 160 of the mount bracket 150 and the hex head bolts securing the top portion 160 of the mount bracket 150 to the bicycle down tube element 30 cannot be accessed for unauthorized removal.

After demountable engagement of an e-bike conversion kit of parts 100 onto a bike's down tube element 30 and demountable engagement of the clamp 128 for the on/off switch 126 and the throttle control assembly 300 with the bike's handlebar 70, the bike's chain 60 can then be placed onto the outermost sprocket gear 55a of the bike's front sprocket assembly 55 and onto the outer sprocket gear 116a of the two-stage sprocket assembly 116 of the electric motive power unit 110 as shown in FIG. 6. A rider is then able to pull the bike's chain 60 over the outer front sprocket gear 116a, then mount and pedal the converted e-bike and provide electric motive power by turning the on/off switch 126 on and applying throttle power 300 as desired depending on the speed and power requirements. If the rider wishes to pedal without motor power, they may do so any time because the two-stage sprocket assembly 116 is a freewheel ratchet system. When the user pedals without motor power, the bicycle's rear chain tensioner/derailleur will freely turn the outer sprocket gear 116a by pulling the chain. When electric motive power is provided, the ratchet system will allow the electric motor 115 and gear assembly 114 to turn the outer front sprocket gear 116a and supply motive power to the chain 60. If the rider wishes, they may switch the front sprocket assembly to the middle sprocket gear 55b and the chain will disengage from the outer sprocket gear 116a and move onto an idler roller component 116b. When the user switches back to the outermost front bicycle sprocket gear the chain will automatically reengage with the outer front sprocket gear 116a and make electric motive power available again at any time. Connecting the two-stage sprocket assembly 116 directly to a bike's existing chain 60 allow for gear changes on the bike's rear derailleur system while riding depending on the amount of incline the bike is traversing. This makes it a demountable 'mid-drive' kit. Coasting without motor power or pedal power is also always available since bikes can coast without chain rotation because the rear wheel sprockets don't rotate if the chain is not applying any force. According to an aspect, the present e-bike conversion kits of parts 100 may be demountably engaged with a down tube element of a bicycle with a single-gear front sprocket by aligning the outer sprocket gear 116*a* of the two-stage sprocket assembly 116 of the electric motive power unit 110 with the bicycle front sprocket gear and then slipping the bicycle chain around the outer sprocket gear 116*a*.

Figure 8:
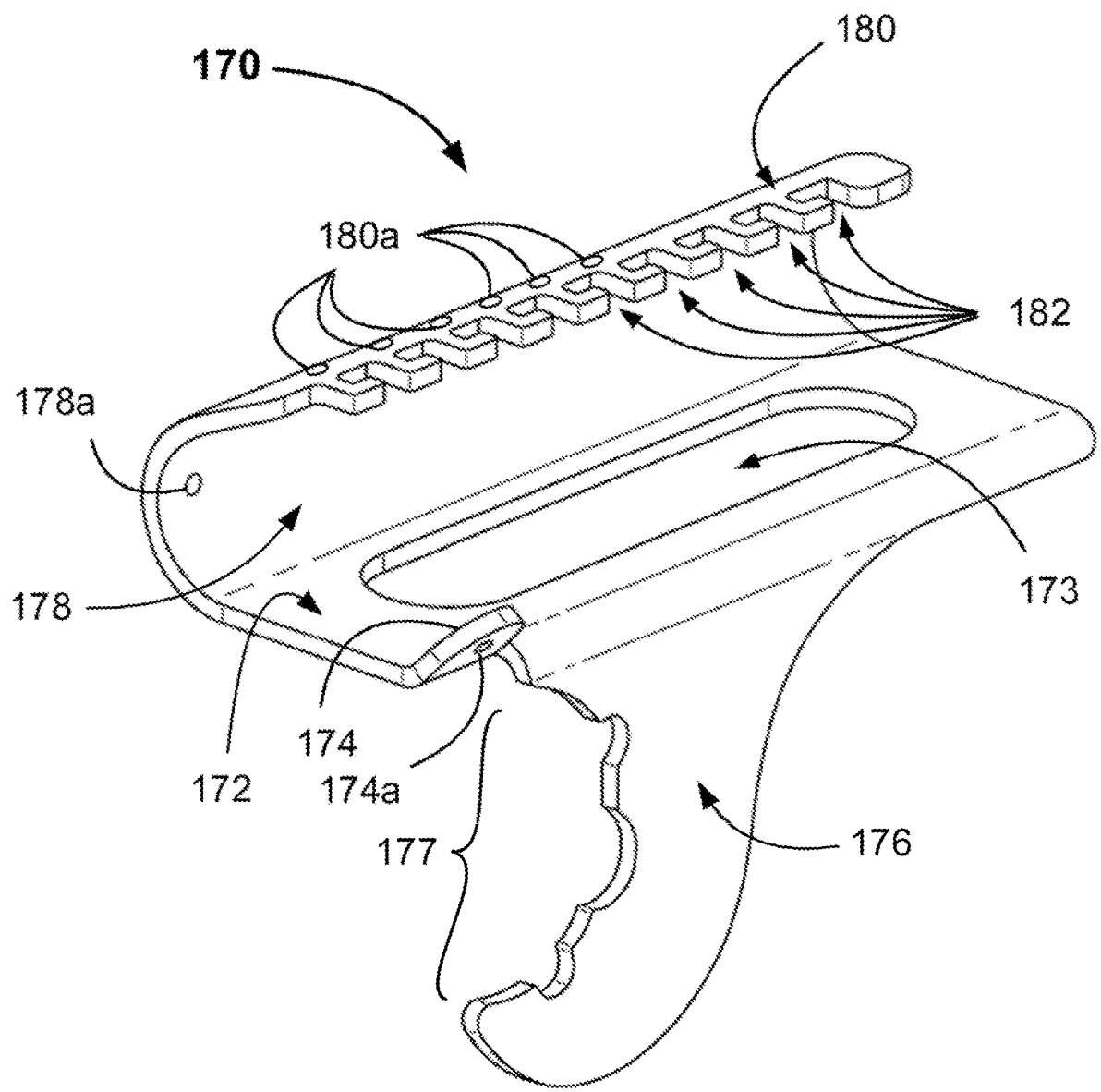
FIG. 8 shows another example embodiment of a one-piece motor mount component of the e-bike conversion kits of parts disclosed herein.
Figure 10:
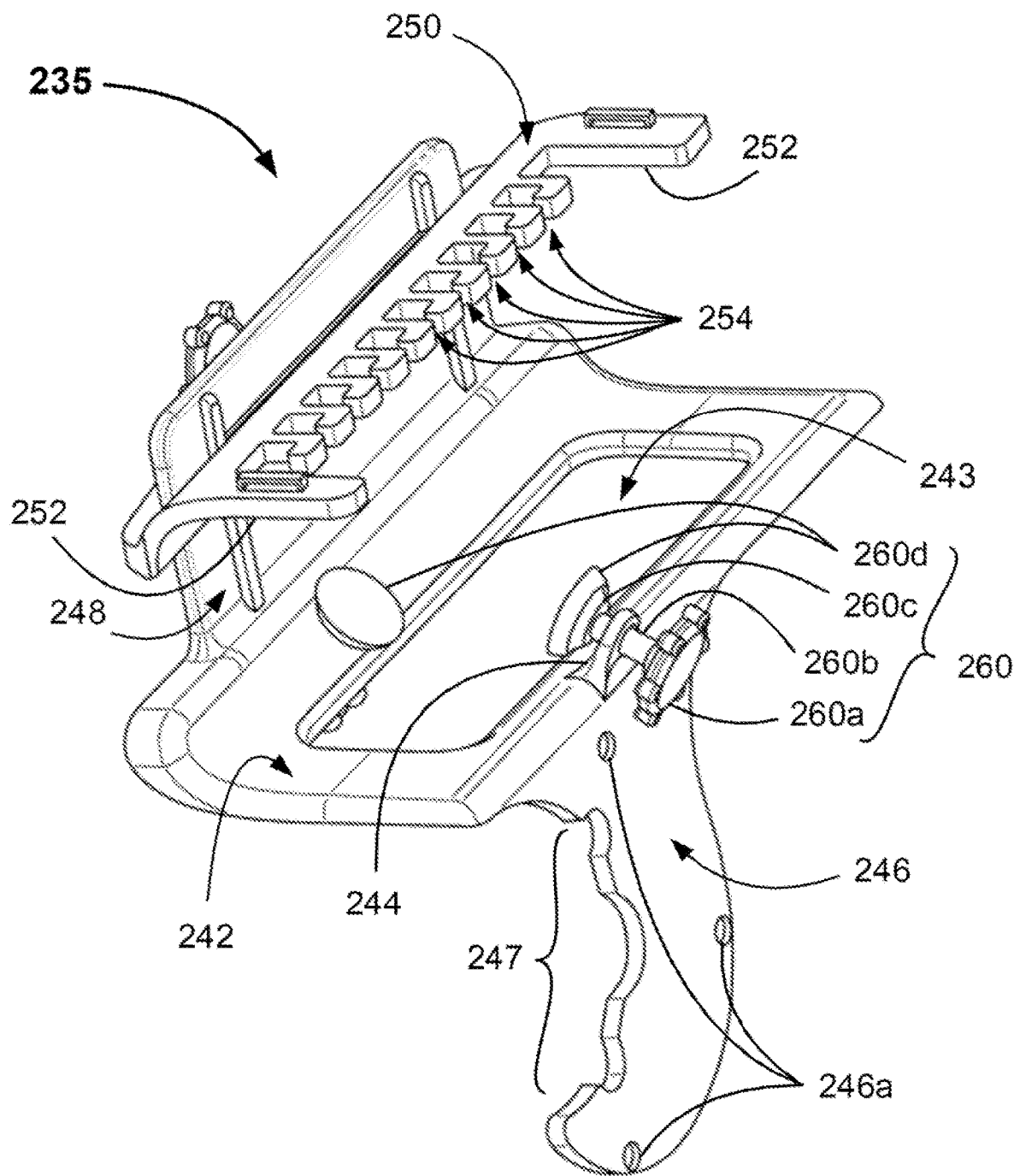
FIG. 10 shows a perspective view an example embodiment of a two-piece motor mount component of the e-bike conversion kits of parts disclosed herein.

Another example of a suitable one-piece mount bracket 170 for demountable engagement with an electric motive power unit 110 and a regular bike, is shown in FIG. 8. The example mount bracket 170 comprises a base portion 172, a downward extending side portion 176, an upward-extending curvilinear side portion 178, and a top surface portion 180 that is parallel to the base portion 172. The rearward-facing edge of the downward-extending side portion 176 is provided with an inward-facing profile 177 that corresponds with the outward-facing profile of the electric motive power unit 110 (FIG. 2), so that when the electric motive power unit 110 is mounted into the mount bracket 170 using a pair of motive power clamp assemblies 164 in threadable engagement with bore 178*a* provided in the upward-extending curvilinear side portion 178, and bore 174*a* in yoke 174 provided extending upward from the base portion 172 opposite bore 178*a*, its two-stage sprocket assembly 116 is projecting rearward from the mount bracket 170 as illustrated in FIG. 1. It is to be noted that the curvilinear upward-extending curvilinear side portion 178 of the one-piece mount bracket 170 terminates in a top surface portion 180 that is parallel to the mounting base portion 172 whereby the base portion 172, the upward-extending curvilinear side portion 178, and the top surface portion 180 form a cradle for receiving and housing therein the electric motive power unit 110 as well as electronic components. The base portion 172 is provided with an upward-extending yoke 174 with a bore 174*a* for receiving therethrough a first clamping bolt assembly 260 (FIG. 10). The upward-extending curvilinear side portion 178 is provided with a bore 178*a* therethrough a second clamping bolt assembly 260 (FIG. 10). The bores 174, 178*a* are positioned about the same distance from the left edge of the mount bracket 170.

The terminal side edge of the top surface portion 180 of the mount bracket 170 is provided with a plurality of equally spaced-apart hook-shaped slots 182. The mount bracket 170 may be demountably engaged with the topside of a regular bike's down tube element by inserting a pair of retaining hex head bolts (not shown) through a selected pair of hook-shaped slots 182 and then threadably engaging the spaced-apart pair of threaded bores provided on the topside of a regular bike's down tube element for demountable engagement with a water bottle cage as illustrated in FIGS. 6, 7. It is to be noted that the positioning of the mount bracket 170 may be adjusted upward along the bike's down tube element by selecting a pair of hook-shaped slots 182 that are closer to the left-end edge of the mount bracket 170, and may be adjusted downward along the bike's down tube element by selecting a pair of hook-shaped slots 182 that are closer to the right-end edge of the mount bracket 150. It should be noted that a pair of slots 182 should be selected so that the outer front sprocket gear 116*a* is positioned such that the bicycle chain 60 is sufficiently wrapped around a bicycle's front sprocket gear 55*a* so that the chain 60 will not slip or jump the front sprocket teeth 55*a* if a rider is applying pedal force only without electric motive power. After the mount bracket 70 has been securely mounted to the bike's down tube element 30, the electric motive power unit 110 may be positioned within the mount bracket's base portion 172 and upward-extending side portion 178 so that its outer external sprocket gear 116*a* is aligned with the bike's outermost front sprocket gear 55*a*, and then secured in place by threadably engaging first and second clamping bolt assemblies 260 with bores 154*a* and 158*a*.

The battery mount bracket 122 may be secured to the top surface portion 180 of the mount bracket 170 by slipping two flat-head machine screws (not shown) through bores 122*b* provided therefore through the battery mount bracket 122 and threadably engaging two selected threaded bores 180*a* in the top surface portion 180 of the one-piece mount bracket. After the rechargeable battery 120 is demountable engaged with the battery mount bracket 122, it may be locked into place with the battery key 121 thereby preventing disengagement of rechargeable battery 120 battery from the battery mount bracket 122, It is to be noted that when the rechargeable battery 120 battery is locked to the battery mount bracket 122, the machine screws securing the battery mount bracket to 122 to the top portion 160 of the mount bracket 170 and the hex head bolts securing the top portion 160 of the mount bracket 170 to the bicycle down tube element 30 cannot be accessed for unauthorized removal.

Figure 9:
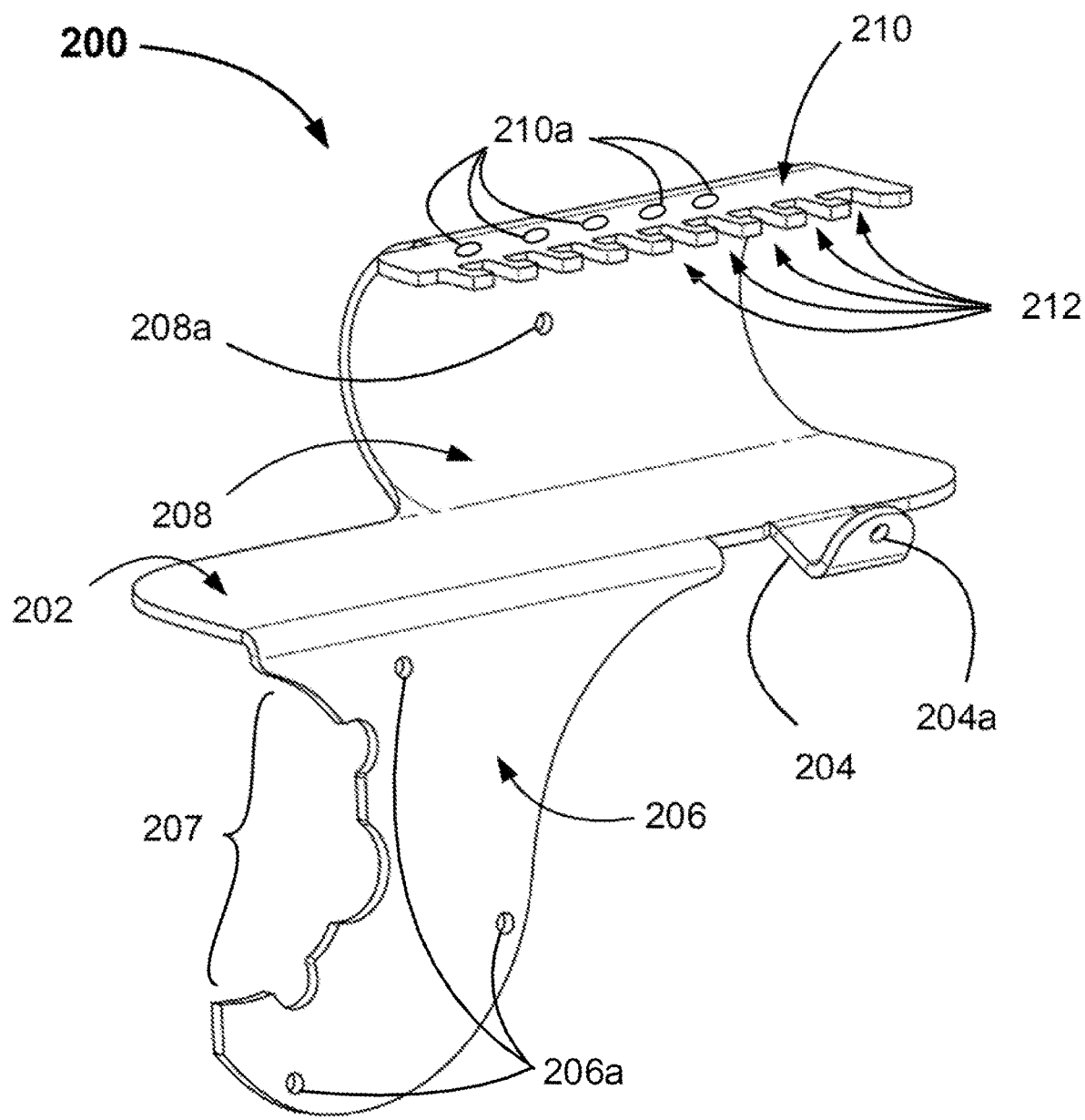
FIG. 9 shows another example embodiment of a one-piece motor mount component of the e-bike conversion kits of parts disclosed herein.

An alternative embodiment for a one-piece mount bracket 200 for the electric motive power unit 110 is illustrated in FIG. 9. The example mount bracket 200 comprises a base portion 202, a downward extending side portion 206, an upward-extending curvilinear side portion 208, and a top surface portion 210 that is parallel to the base portion 202. The rearward-facing edge of the downward extending side portion 206 is provided with an inward-facing profile 207 that corresponds with the outward-facing profile of the electric motive power unit 110 (FIG. 2), so that when the electric motive power unit 110 is mounted into the mount bracket 200, its two-stage sprocket assembly 116 is projecting rearward from the mount bracket 200 as illustrated in FIG. 1. It is to be noted that the curvilinear upward-extending curvilinear side portion 208 of the one-piece mount bracket 200 terminates in a top surface portion 200 that is parallel to the mounting base portion 202 whereby the base portion 202, the upward-extending curvilinear side portion 208, and the top surface portion 210 form a cradle for receiving and housing therein the electric motive power unit 110. The base portion 202 is provided with an upward-extending yoke 204 with a bore 204*a* for receiving therethrough a first clamping bolt assembly 260 illustrated in FIG. 11. The upward-extending curvilinear side portion 208 is provided with a bore 108*a* therethrough a second clamping bolt assembly 260 illustrated in FIG. 11. The bores 204, 208*a* are located about the same distance from the right edge of the mount bracket 200. After an electric motive power unit 110 is mounted into the mount bracket 200, the mount bracket may be demountably clamped into place with the first and second clamping bolt assemblies 260.

The terminal side edge of the top surface portion 210 of the mount bracket 200 is provided with a plurality of equally spaced-apart hook-shaped slots 212. The mount bracket 200 may be demountably engaged with the topside of a regular bike's down tube element by inserting a pair of retaining hex head bolts (not shown) through a selected pair of hook-shaped slots 212 and then threadably engaging the spaced-apart pair of threaded bores provided on the topside of a regular bike's down tube element for demountable engagement with a water bottle cage as illustrated in FIGS. 6, 7. It is to be noted that the positioning of the mount bracket 200 may be adjusted upward along the bike's down tube element by selecting a pair of hook-shaped slots 212 that are closer to the left-end edge of the mount bracket 200, and may be adjusted downward along the bike's down tube element by selecting a pair of hook-shaped slots 212 that are closer to the right-end edge of the mount bracket 200. It is to be noted that the length of the top surface portion 210 is about a third shorter than the length of the base portion 202 and therefore, the range of upward repositioning of the mount bracket 200 along the topside of a bike's down tube element 30 is smaller than the range downward positioning of the mount bracket 200 along the topside of a bike's down tube element 30.

The battery mount bracket 122 may be secured to the top surface portion 210 of the mount bracket 200 by slipping two flat-head machine screws (not shown) through bores 122b provided therefore through the battery mount bracket 122 and threadably engaging the two threaded bores 210a in the top surface portion 210 of the one-piece mount bracket. After the rechargeable battery 120 is demountably engaged with the battery mount bracket 122, it may be locked into place with the battery key 121 thereby preventing disengagement of rechargeable battery 120 battery from the battery mount bracket 122, It is to be noted that when the rechargeable battery 120 battery is locked to the battery mount bracket 122, the machine screws securing the battery mount bracket to 122 to the top portion 210 of the mount bracket 200 and the hex head bolts securing the top portion 210 of the mount bracket 200 to the bicycle down tube element 30 cannot be accessed for unauthorized removal.

Figure 11:
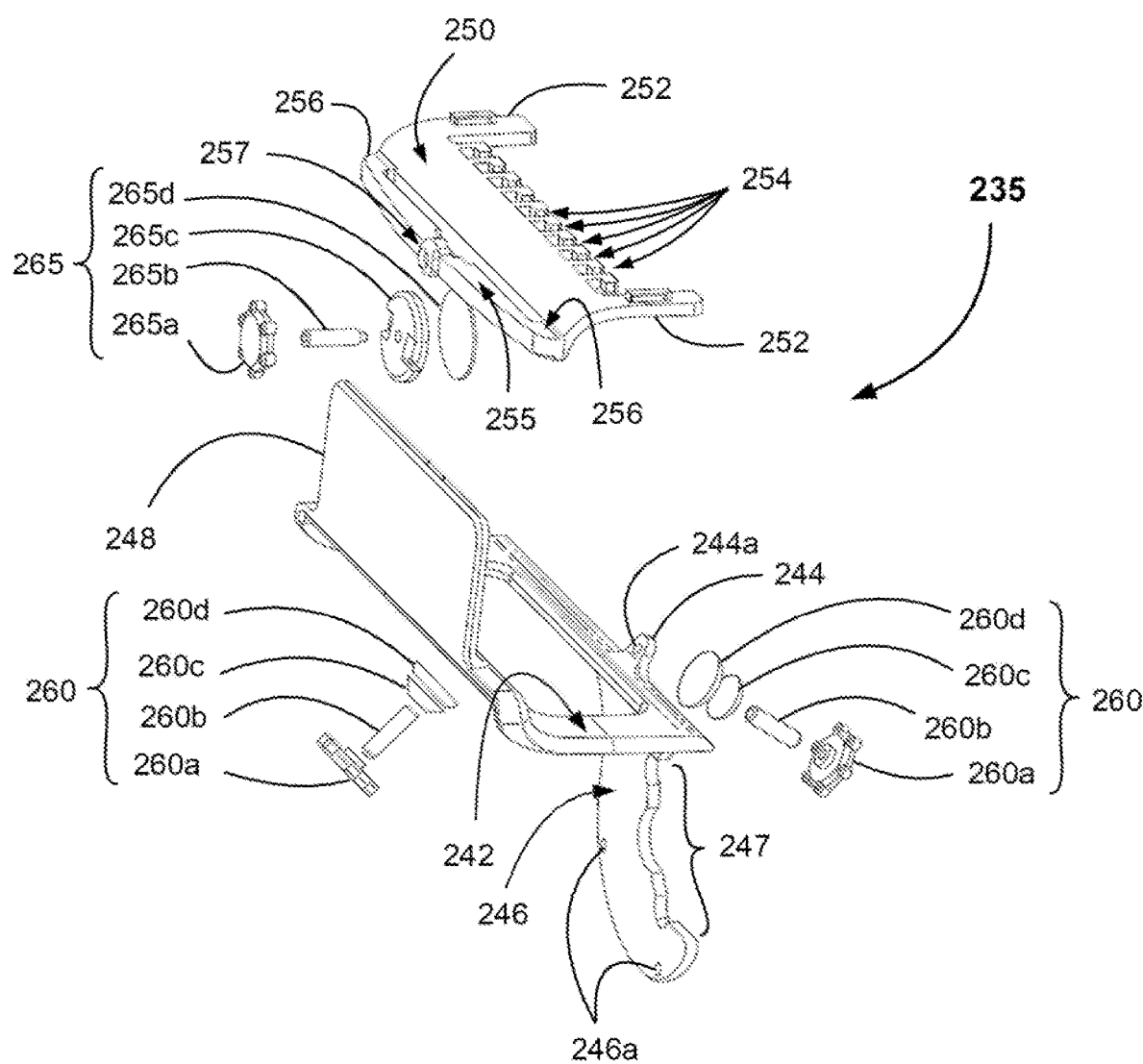
FIG. 11 is an exploded rear perspective exploded view of the two-piece motor mount component shown in FIG. 10.
Figure 12:
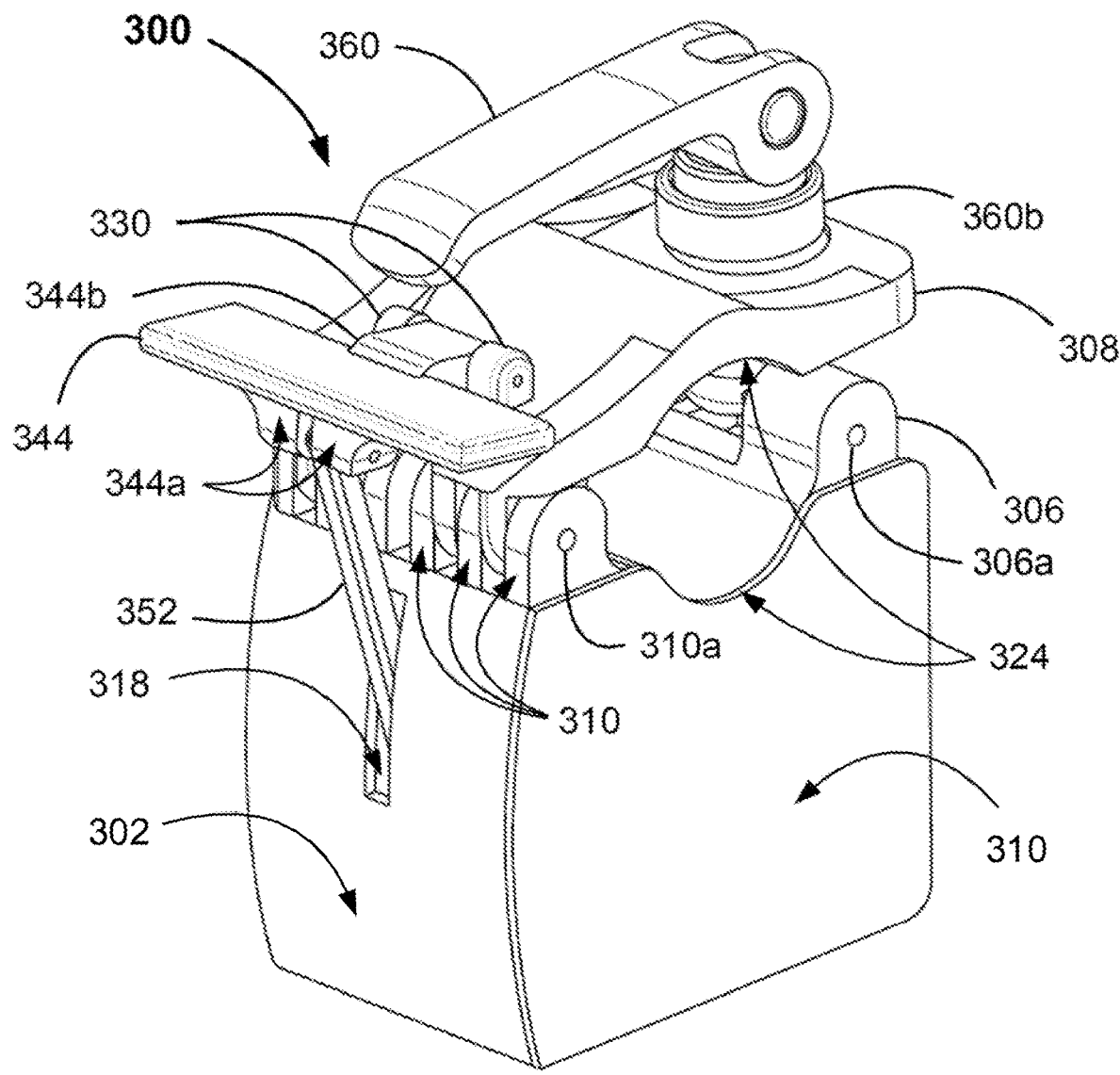
FIG. 12 is a front perspective view of the example embodiment of a throttle control assembly shown in FIG. 4B.
Figure 13:
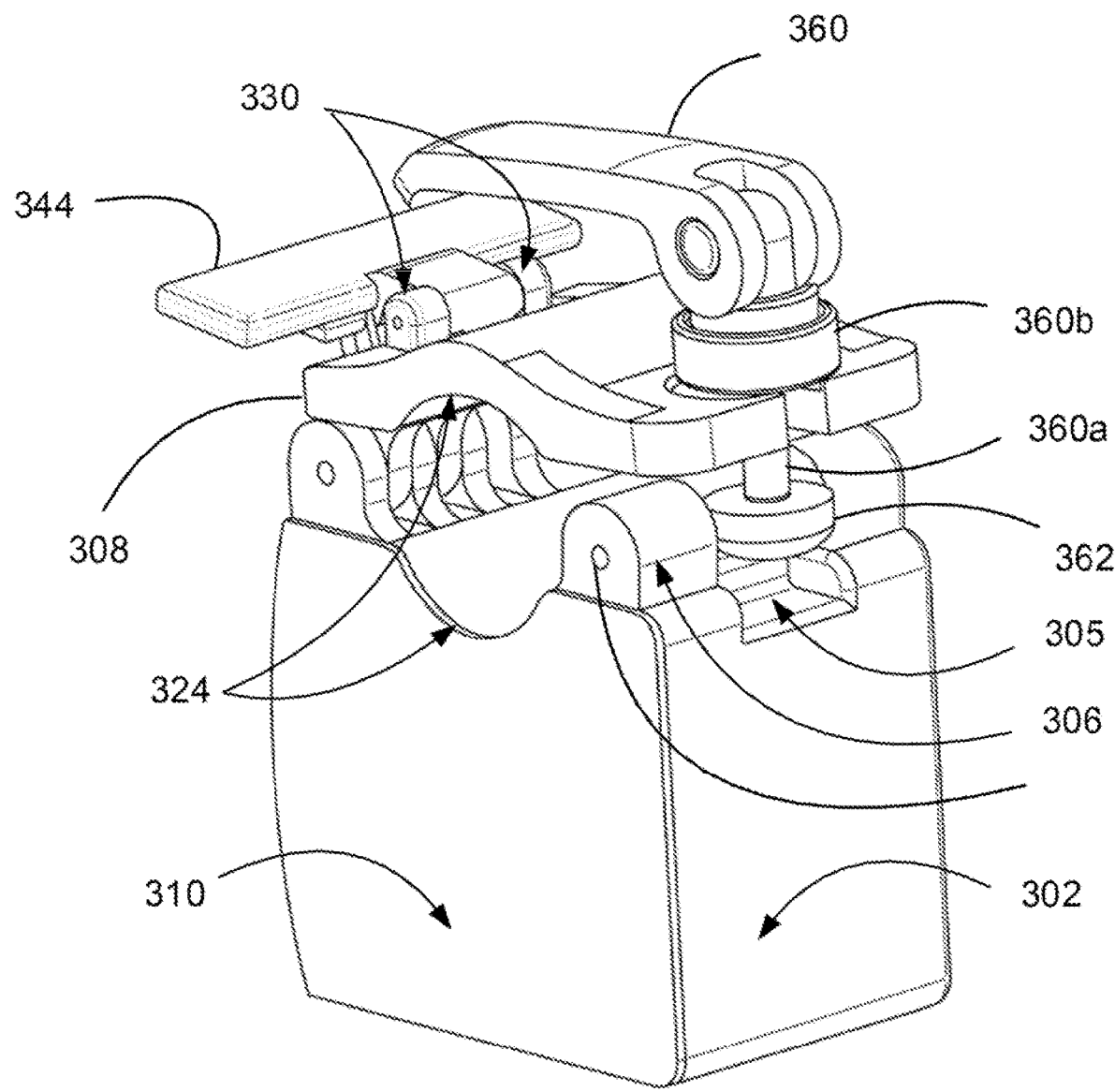
FIG. 13 is a rear perspective view of the throttle control assembly shown in FIG. 12.
Figure 14:
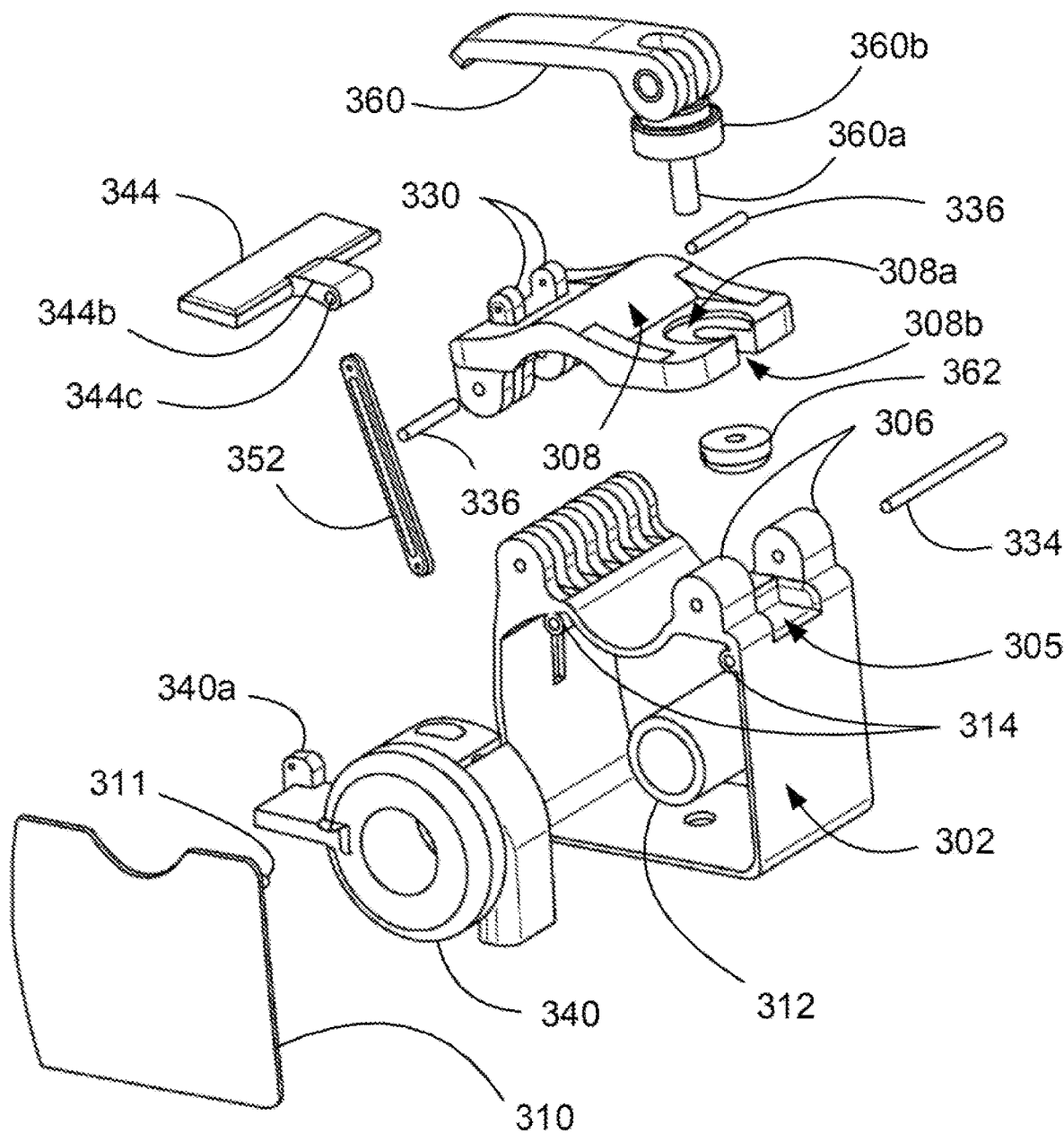
FIG. 14 is a front perspective exploded view of the throttle control assembly shown in FIG. 12.
Figure 18:
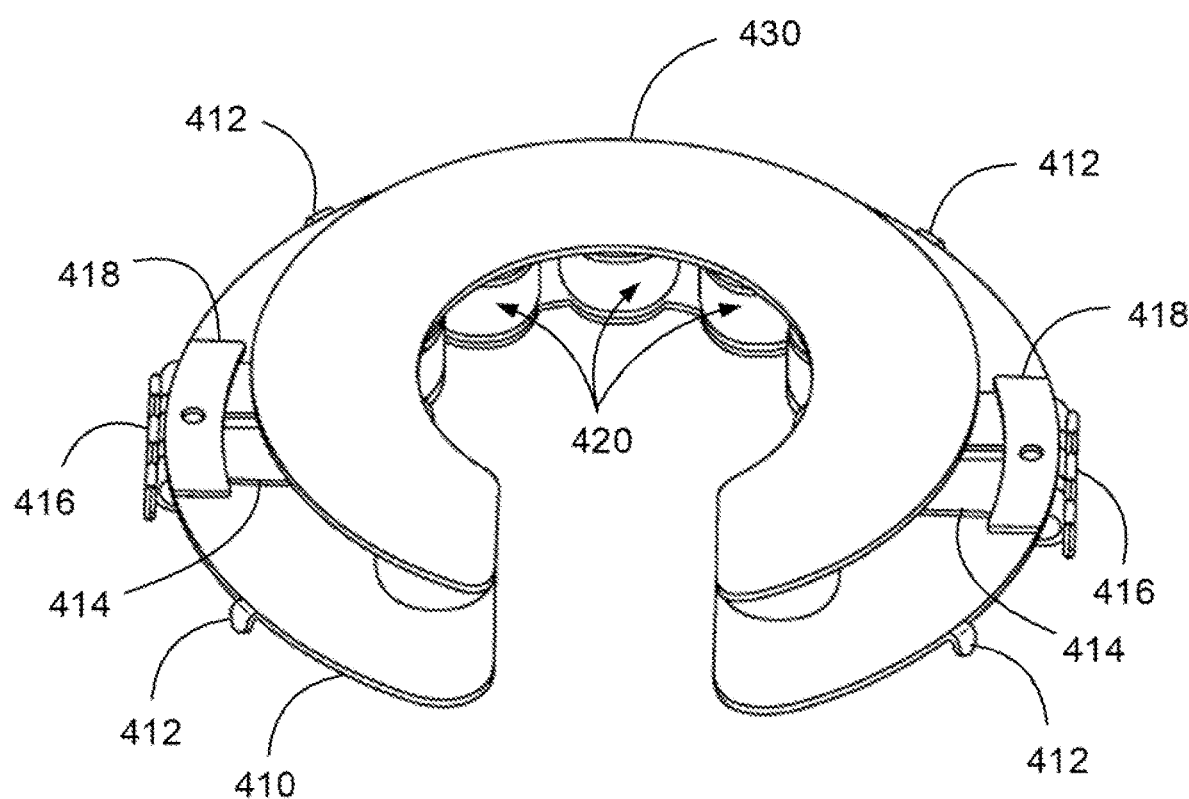
FIG. 18 is a perspective view of an example bearing ring assembly configured for demountable engagement with a bicycle front sprocket assembly.
Figure 19:
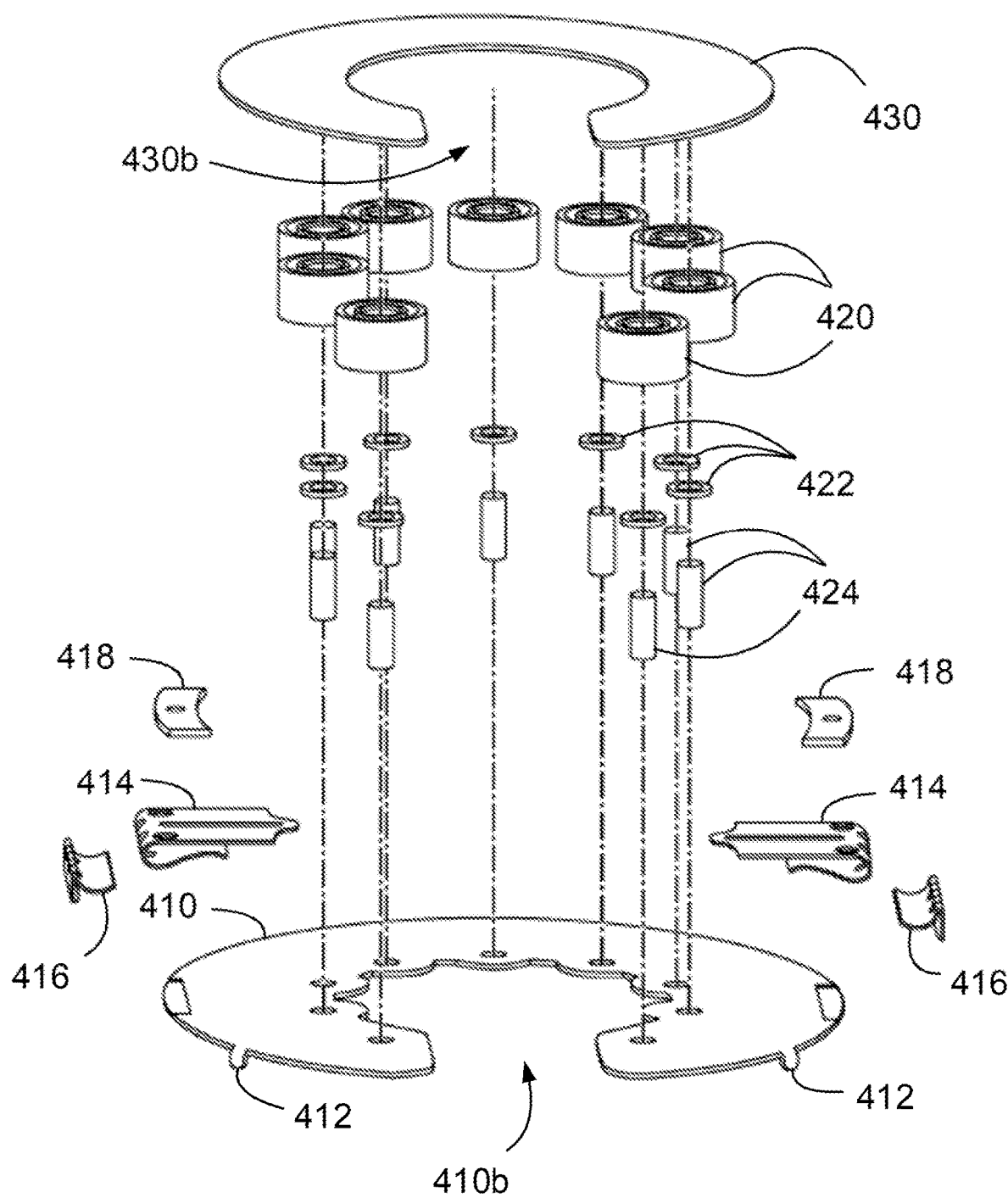
FIG. 19 is an exploded perspective view of the bearing ring assembly shown in FIG. 18.
Figure 21:
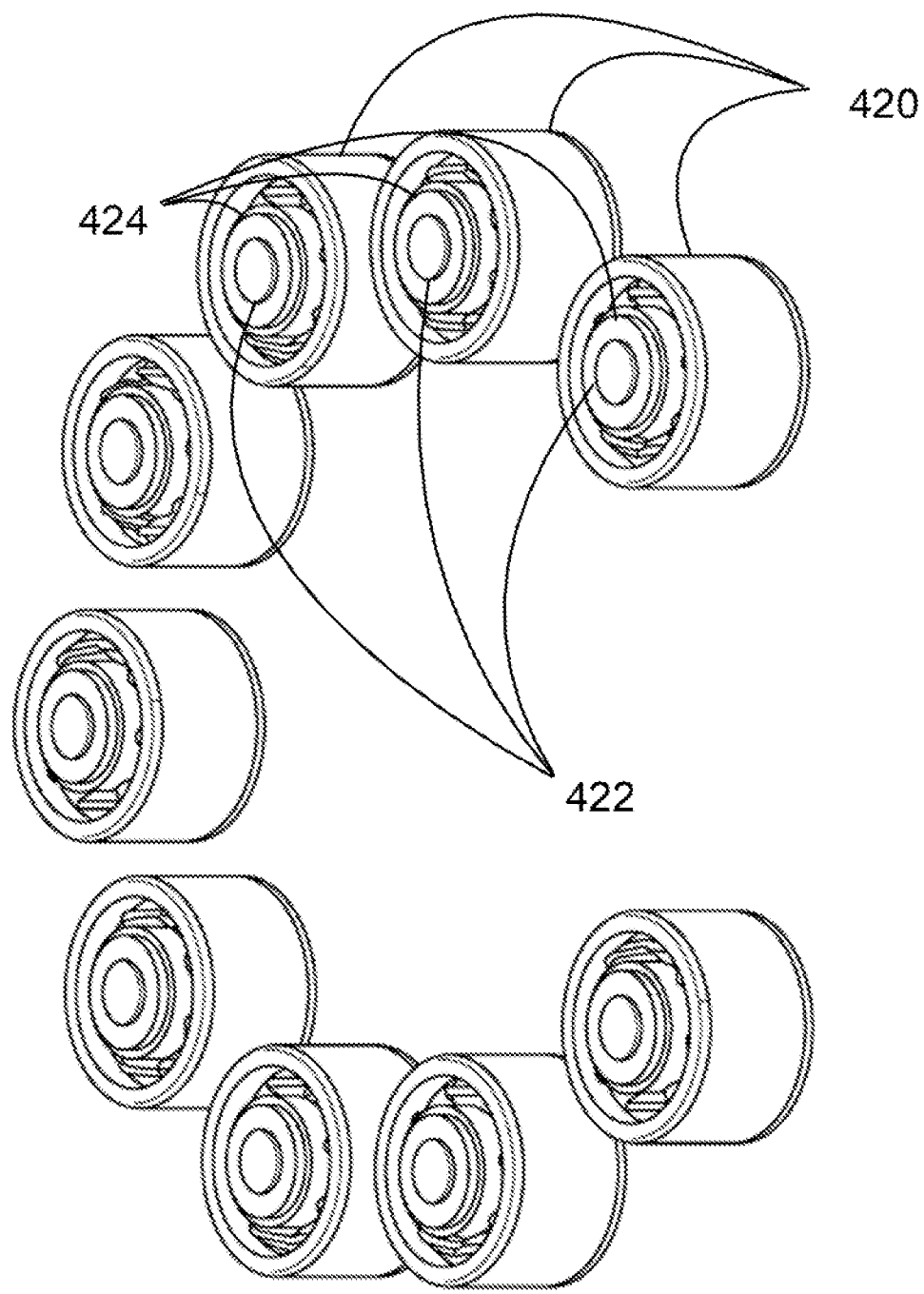
FIG. 21 is a perspective view of the bearing components shown in FIG. 19.
Figure 23:
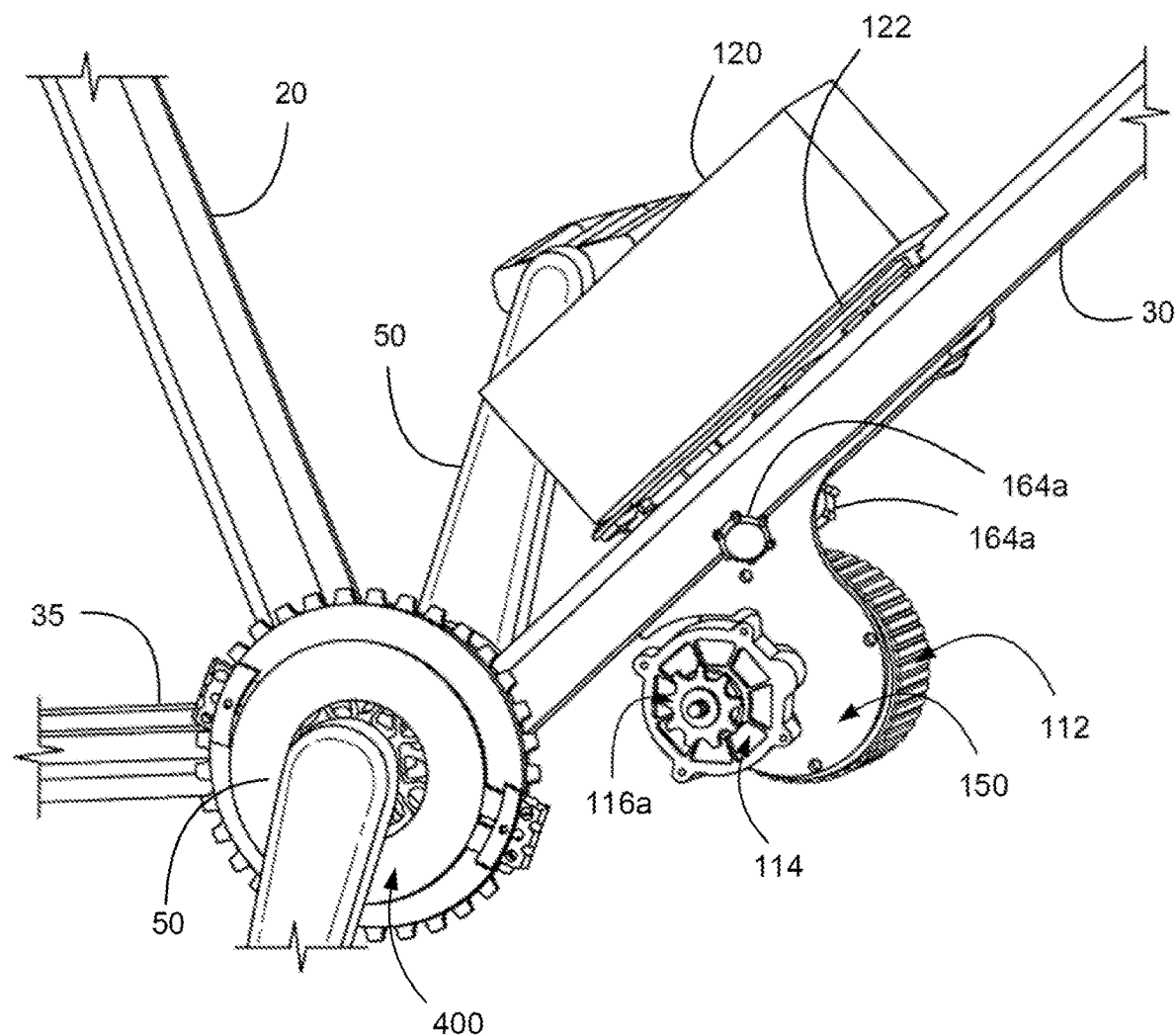
FIG. 23 is a side view of an example embodiment of a bearing ring assembly shown engaged with a bicycle front sprocket assembly, with an example electric motive power assembly engaged with the bicycle frame.
Figure 24:
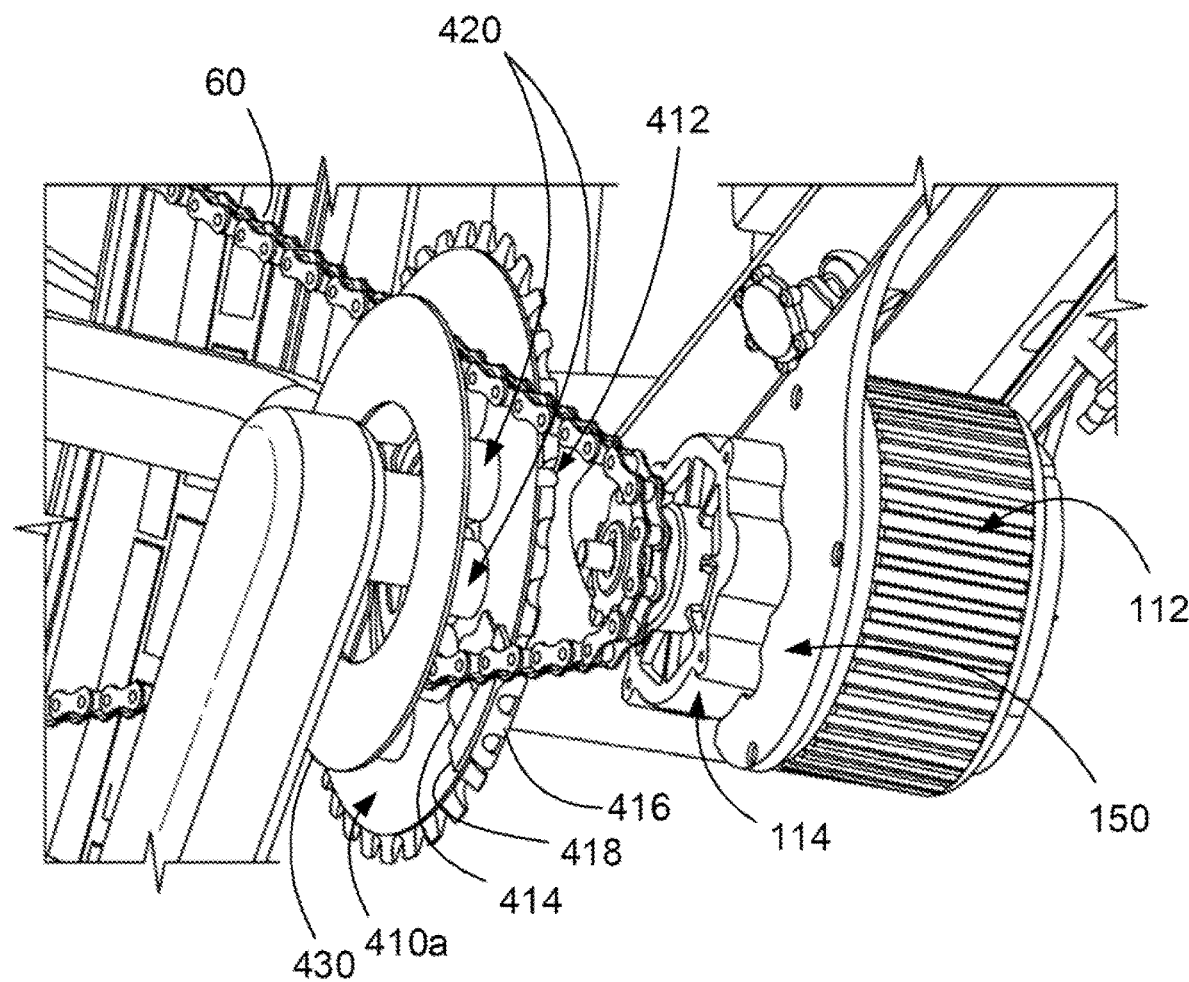
FIG. 24 is a perspective front view of the bearing ring assembly shown in FIG. 23, wherein a bicycle chain shown demountably engaged with (a) the outer most sprocket gear of the bicycle front socket assembly, and (b) the outer most sprocket gear of the electric motive power unit.

An alternative embodiment for a two-piece mount bracket 235 for the electric motive power unit 110 is illustrated in FIGS. 10, 11. This example two-piece mount bracket 235 comprises a lower mount bracket 240 and an upper mount bracket 250. The lower mount bracket 240 comprises a base portion 242, a downward extending side portion 246, an upward-extending side portion 248. The rearward-facing edge of the downward extending side portion 246 is provided with an inward-facing profile 247 that corresponds with the outward-facing profile of the electric motive power unit 110 (FIG. 2), so that when the electric motive power unit 110 is mounted into the mount bracket 240, its two-stage sprocket assembly 116 is projecting rearward from the mount bracket 240 as illustrated in FIG. 1.

The base portion 242 of the lower mount bracket 240 is provided with an upward-extending yoke 244 with a bore 244a for receiving therethrough a first clamping bolt assembly 260 (FIG. 10). A corresponding bore (not shown) for receiving a second clamping bolt assembly 260 is provided in the curvilinear juncture of the base portion 242 and the upward-extending side portion 248. The clamping bolt assemblies 260 comprise a knob 260a, an adjusting screw 260a rotationally engaged at one end with the knob 260a and at its other end with a swivel head 260c. A compressible rubber gasket 260d is provided at the end of the clamping bolt assembly 260 for secure engagement with a side of an electric motive power unit 110.

The upper mount bracket 250 comprises a flat top surface with a front-facing terminal elongate side edge having opposed outward extending arms 252 with a plurality of equally spaced-apart outward-facing hook-shaped slots 254 provided there between. The rearward-facing terminal elongate side edge is provided with an arm 255 that is integrally formed with the end edges of upper mount bracket 250 thereby defining a through-slot 256 that is configured for sliding communication with the upward-extending side portion 248 of the lower mount bracket 240. A collar 257 with a threaded bore therethrough is provided around the rear arm at about the midpoint between the two end edges of the upper mount bracket 250 for rotational engagement with a two-piece mount clamping assembly 265 that comprises a knob 265a, an adjusting screw 265a rotationally engaged at one end with the knob 260a and at its other end with a swivel head 265c. A compressible rubber gasket 265d is provided at the end of the clamping bolt assembly 265 to enable a secure engagement of the upper mount bracket 250 with the upward-extending side portion 248 of the lower mount bracket 240.

An example electric motive power unit 110 may be placed onto the base 242 of the lower mount bracket 240 and secured thereto with mounting screws (not shown) inserted through the bores 246a provided therefor in the downward extending side portion 246. The upper mount bracket 250 is then slidably engaged with the lower mount bracket 242 by sliding the through-slot 256 over the upward-extending side portion 248 until the bottom surface of the upper mount bracket 250 contacts the top surface of the electric motive power unit 110. Then, the clamping bolt adjusting screw 265b is inserted through the bore in the collar 257 by the clamping bolt knob 265a, and engaged with the clamping bolt swivel head 265c and rubber gasket 265d, and threadably engaged by the clamping bolt assembly 260 with the threaded bore 257 provided therefor in the collar 257 to securely engage the upper mount bracket to the upward-extending side portion 248. The electric motive power unit 110 may then be securely engaged within the two-piece mount bracket 235 with clamping bolt assemblies 260 threadably engaged with the bores provided therefor in the yoke 244 on the base of the lower mount 242, and the corresponding bore (not shown) provided therefor in the curvilinear juncture of the base portion 242 and the upward-extending side portion 248.

The plurality of equally spaced-apart hook-shaped slots 254 in the upper mount bracket 250 may be demountably engaged with the topside of a regular bike's down tube element by inserting a pair of retaining hex head bolts (not shown) through a selected pair of hook-shaped slots 254 and then threadably engaging the spaced-apart pair of threaded bores provided on the topside of a regular bike's down tube element for demountable engagement with a water bottle cage (FIGS. 6, 7). The slots 254 also allow the upper mount bracket 250 to be installed without first removing the retaining hex head bolts (not shown) from the bike's down tube element. It is to be noted that the positioning of the two-piece mount bracket 235 may be adjusted upward along the bike's down tube element by selecting a pair of hook-shaped slots 254 that are closer to the left-end edge of the two-piece mount bracket 235, and may be adjusted downward along the bike's down tube element by selecting a pair of hook-shaped slots 254 that are closer to the right-end edge of the two-piece mount bracket 235. It is to be noted that the positioning of the two-piece mount bracket 235 may be adjusted upward along the bike's down tube element by selecting a pair of hook-shaped slots 254 that are closer to the left-end edge of the two-piece mount bracket 235, and may be adjusted downward along the bike's down tube element by selecting a pair of hook-shaped slots 254 that are closer to the right-end edge of the two-piece mount bracket 235. It should be noted that a pair of slots 254 should be selected so that the motor sprocket gear 116a is positioned such that the bicycle chain 60 is sufficiently wrapped around a bicycle's front sprocket gear 55a so that the chain 60 will not slip or jump the front sprocket teeth 55a if a rider is applying pedal force only without electric motive power.

The battery mount bracket 122 may be secured to the top surface portion 250 of the upper mount bracket 250 by slipping two flat-head machine screws (not shown) through bores 122b provided therefore through the battery mount bracket 122 and threadably engaging the two threaded bores 250a in the top surface portion 250 of the upper mount bracket 250. After the rechargeable battery 120 is demountable engaged with the battery mount bracket 122, it may be locked into place with the battery key 121 thereby preventing disengagement of rechargeable battery 120 battery from the battery mount bracket 122, It is to be noted that when the rechargeable battery 120 battery is locked to the battery mount bracket 122, the machine screws securing the battery mount bracket to 122 to the top portion 250 of the upper mount bracket 250 and the hex head bolts securing the top portion 250 of the upper mount bracket 250 to the bicycle down tube element 30 cannot be accessed for unauthorized removal.

An example embodiment of a suitable quick-release throttle assembly 300 demountable with a handlebar for controlling the amount of electric motive power that is delivered by the electric motive power unit 110 to a bike's front sprocket assembly 55, is illustrated in FIGS. 12 to 17. An example quick-release throttle assembly 300 generally comprises a throttle base 302 with front hinge fingers 304 and rear upward-extending yokes 306, a throttle top cover 308 with front downward-extending hinge fingers 309 configured for hinged cooperation with the throttle base front hinge fingers 304. The upper surface of the throttle base 302 and the lower surface of the throttle top cover 308 are provided with matching concave channels 324 that are configured for snug demountable engagement with a handlebar 70. The throttle base 302 is provided with a first side cover 310 provided with a plurality of pegs 311 extending outward therefrom for demountable engageable with the bores 314 provided therefore in tubular members extending along the vertical and horizontal wall junctures of the throttle base 302. The throttle base 302 is provided with a second side cover 310 provided with a plurality of pegs 311 extending outward therefrom for demountable engageable with the bores 114 provided therefore at the other ends of the tubular members extending along the vertical and horizontal wall junctures of the throttle base 302. The second side cover 310a is provided with a tubular member 312 that extends laterally into the chamber defined by the front and back ends, the bottom, and the top of the throttle base 302. A throttle actuator 340 is provided for sliding and rotational engagement within the throttle base chamber, with the tubular member 312. The front face of the throttle chamber 302 is provided with a vertical slot 318 therethrough. One end of a throttle shaft 352 is engaged at one end with a hinge pin inserted therethrough and through a yoke 340a provided therefore on the throttle actuator 340. The other end of the throttle shaft 352 is hingedly engaged with a pair of yokes 344a extending downward from a throttle thumb control 344. The throttle thumb control 344 additionally comprises a throttle thumb push bar and a backward-extending throttle thumb arm 344b having a bore 348c provided at the distal end of the throttle thumb arm 344b. The throttle top cover 308 is provided with upward-extending hinge fingers 330 configured for receiving therein the distal end of the throttle thumb arm 344b and for hinged cooperation therewith a hinge pin inserted through the bores provided therefor in the upward-extending hinge fingers 330 and bore 344c at the distal end of the throttle thumb push bar 344b.

According to an example embodiment, the rear-facing ends of the throttle base 302 and the throttle top 308 may be configured to cooperate with a quick-release cam lever 360 to enable rapid and easy demountable engagement with a bike handlebar without a need for removal of the handlebar grips. The top surface of the rear-facing end of the throttle base 302 is provided with a pair of upward-extending yokes 306 with bores therethrough, and with a recessed cavity 305 between the upward-extending yokes 306. The rear-facing surface on the throttle top cover 308 is provided with an annular recess 308a with a vertical channel 308b extending inward from the rear edge of the throttle top cover 308. The quick-release cam lever 360 is provided with a downward-extending cam lever pin 360a with a cam lever base 306b engaged with a proximal end of cam lever pin 360a at the base of the quick-release cam lever 360. The distal end of the cam lever pin 306a is engaged with a center bore 362a of a quick-release nut 362 having a bore 362a extending laterally therethrough for receiving a hinge pin 334 therethrough, said hinge pin 334 engaged with bores 306a provided therefor in the throttle base rear upward-extending yokes 306.

In use, the quick-release throttle control assembly 300 may be quickly demountable engaged with a bike handlebar 70 by operating the quick-release cam lever 360 to disengage the cam lever base 360b from the rear-facing annular recess 308a in the throttle top cover 308 whereby the cam lever 306 and cam lever pin 360a can be moved out of the vertical channel 308b to thereby enable separation of the rear of the throttle top cover 308 from the throttle base 302. The throttle control assembly may then be slipped around the handlebar 70 after which, the quick-release cam lever 360 and the cam lever pin 360a may be moved back through the vertical channel 308b to the center of the rear-facing annular recess 308a in the throttle top cover 308 after which, the quick-release cam lever 360 may be operated to clamp the throttle top cover 308 and the throttle base 302 around the handlebar 70.

Figure 25:
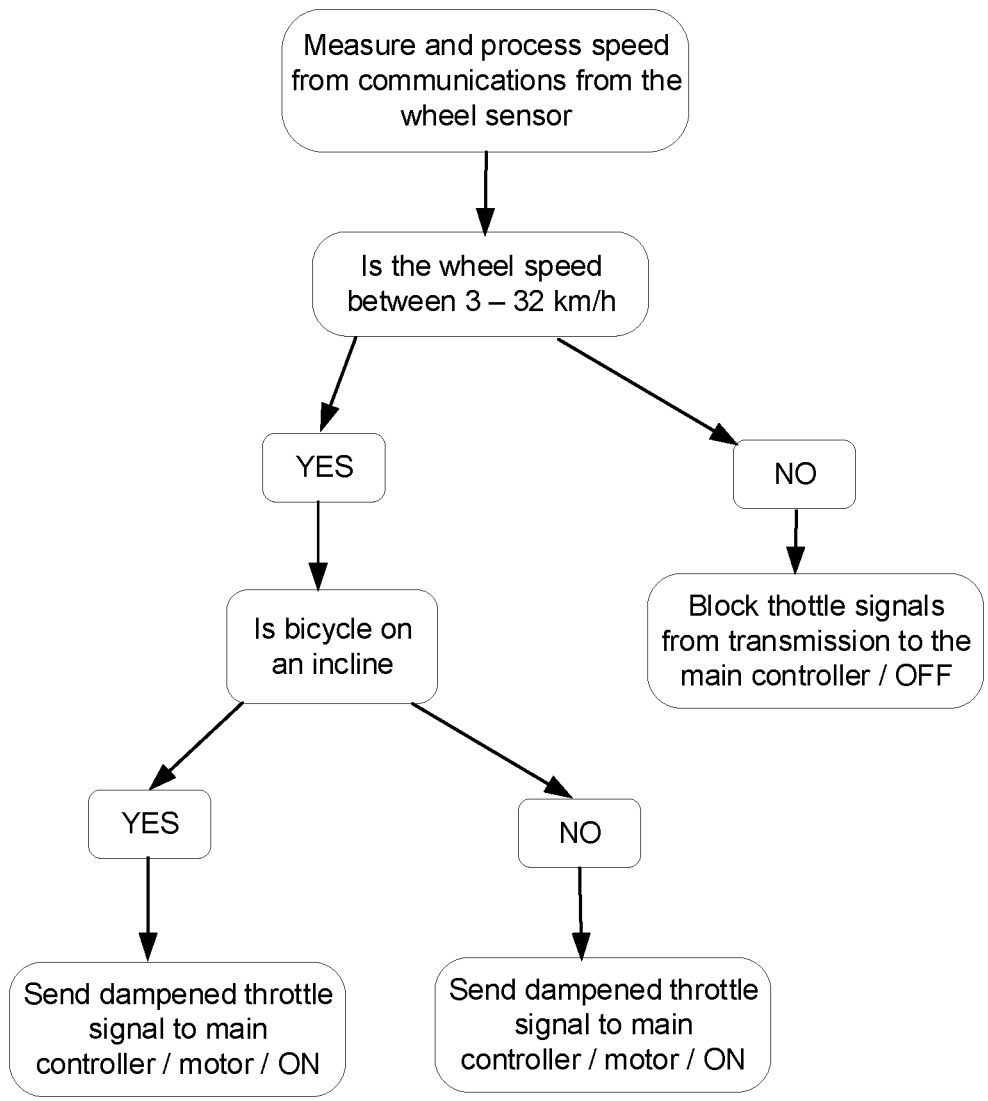
FIG. 25 is a schematic flowchart of a decision tree for processing steps in an example of a microprocessor for controlling supplementary motive power.

According to another example embodiment, power delivered by the electric motive power unit 110 to the bike's front sprocket assembly 55, may be controlled by a rider riding a bicycle equipped with an e-bike conversion kit of parts. According to one aspect, an off-the-shelf standard DC motor controller may be attached to a mount bracket 200, 200, 235 for the electric motive power unit 110 and may be in communication with the quick-release throttle assembly 300 via communication cable 130. Housed within the quick-release throttle assembly 300 is a circuit board (not shown) in communication with the communication cable 130 and a sensor in communication with the front wheel. The circuit board may be provided with a microprocessor that when the on/off switch 126 is turned on, constantly monitors and processes signals communicated from the electric motive power unit 110 and the sensor in communication with the front wheel. The microprocessor monitors and processes the rider's speed on the bicycle to modulate the electric motive power to the bike's front sprocket assembly, depending on various e-Bike speed regulations, and generally following, for example, the process steps outlined in the decision tree on the next page. The circuitry also allows for the dampening of the throttle signal to reduce the impact of uncontrolled or aggressive throttle application unless it senses an uphill incline where faster power application is necessary. If so desired, the microprocessor may also be programmed to monitor and process signals received from gear ratio sensors and/or from cadence sensors. A general overview of the processing steps are shown in FIG. 25:

When a rider wishes for electric power assist while riding a bike provided with an assembled e-bike conversion kit of parts according to the present disclosure, they merely have to turn the on/off switch on, switch their front sprocket assembly to the outermost sprocket and then operate the thumb throttle to increase or decrease the magnitude of electric motive power delivered to the bike's front sprocket assembly.

In use, the quick-release throttle control assembly 300 may be quickly demountable engaged with a bike handlebar 70 by operating the quick-release cam lever 360 to disengage the cam lever base 360b from the rear-facing annular recess 308a in the throttle top cover 308 whereby the cam lever 306 and cam lever pin 360a can be moved out of the vertical channel 308b to thereby enable separation of the rear of the throttle top cover 308 from the throttle base 302. The throttle control assembly may then be slipped around a handlebar after which, the quick-release cam lever 360 and the cam lever pin 360a may be moved back through the vertical channel 308b to the center if the rear-facing annular recess 308a in the throttle top cover 308 after which, the quick-release cam lever 360 may be operated to clamp the throttle top cover 308 and the throttle base 302 around the handlebar 70.

Another embodiment of the present disclosure relates to a bearing ring assembly configured for demountable engagement with a regular bicycle's front sprocket. An example of a suitable bearing ring assembly 400 is illustrated in FIGS. 17 to 23, and generally comprises a sprocket connection plate 410 configured for demountable engagement with the outermost sprocket gear of the bike's front sprocket assembly, a bearing cover plate 430, and a plurality of equidistantly spaced-apart roller bearings 420 fitted between the sprocket connection plate 410 and the bearing cover plate 430.

The sprocket connection plate 410 is provided with four equidistantly spaced-apart teeth 412 extending perpendicularly outward from the plate 410 (best seen in FIG. 17) for engaging four spaced-apart notches between the sprocket teeth on the outermost sprocket gear of a bike's front sprocket assembly. A pair of opposing notched recesses 410d is provided on the inner surface 410a of the sprocket connection plate 410 for receiving and seating therein spring clips 414 provided for demountable engagement of the outward-facing surface of the sprocket connection plate 410 with the outermost sprocket gear on the bike's front sprocket gear. Each spring clip 416 may be locked in place in cooperation with a spring clip pull tab 416 and a spring clip holder 418. The inner surface 410a of the sprocket connection plate 410 is provided with a plurality of equidistantly spaced-apart annular recesses 410c around the axis of the sprocket connection plate 410. The inner surface 430a of the bearing cover plate 430 is provided with a plurality of equidistantly spaced-apart annular recesses 430c around the axis of the bearing cover plate 430 that are aligned with and match the equidistantly spaced-apart annular recesses 410c around the axis of the sprocket connection plate 410. Each bearing 420 in the plurality of bearings 420 is provided with a bearing rod 42 therethrough with washers/spacers 422 thereon each side of the bearing 420. The ends of each bearing rod 424 are seated in a selected opposing matching annular recess 410c in the sprocket connection plate 410 and annular recess 430c in the bearing cover plate 430. The sprocket connection plate 410 and the bearing cover plate 430 are provided with matching gaps 41ab, 430b in their circumferences so that when assembled, the bearing ring may be easily slipped over the bike's right-side pedal and onto the other sprocket gear of the front sprocket assembly.

As used herein, the term "and/or" refers to and encompasses any and all possible combinations of one or more of the associated listed items (for example, one or the other, or both), as well as the lack of combinations when interrupted in the alternative (or).

In the present disclosure, all terms referred to in singular form are meant to encompass plural forms of the same unless context clearly dictates otherwise. Likewise, all terms referred to in plural form are meant to encompass singular forms of the same unless context dictates otherwise.

As used herein, the term "about", when referring to a measurable value, refers to an approximately +/−10% variation from a given value. It is understood that such a variation is always included in any given value provided herein, whether or not it is specifically referred to.

NUMBER KEY

| | |
|---|---|
| 20 | seat tube element |
| 30 | down tube element |
| 35 | chain stay element |
| 50 | pedal |
| 55 | front sprocket assembly |
| 55a | outermost front sprocket gear |
| 55b | middle front sprocket gear |
| 55c | innermost front sprocket gear |
| 60 | chain |
| 70 | handlebar |
| 75 | left handlebar grip |
| 80 | right handlebar grip |
| 100 | assembled e-bike conversion kit of parts |
| 110 | electric motive power unit |
| 112 | housing with a battery powered motor |
| 114 | housing with a gear assembly |
| 116 | two-stage sprocket assembly |
| 116a | outer sprocket gear |
| 116b | idler roller |
| 118 | power cord from motor to the battery mount |
| 119 | power cord terminal or engagement with the battery mount bracket socket |
| 120 | battery |
| 122 | battery mount bracket |
| 122a | socket in battery mount bracket or demountable engagement with power cord terminal 119 |
| 122b | bores in battery mount bracket |
| 124 | power cable from the electric motor to the on/off switch |
| 126 | on/off switch |
| 128 | demountable handlebar clamp for the on/off switch |
| 130 | communication cable from the electric motor to the throttle control assembly |
| 150 | 1-piece mount bracket for electric motive power unit |
| 152 | mounting base portion |
| 153 | elongate bore in the mounting base |
| 154 | yoke for clamping screw |
| 154a | bore in yoke 154 |
| 156 | downward-extending side portion |
| 157 | profile in downward-extending side portion for engaging the motive power unit |
| 158 | upward-extending side portion |
| 158a | bore in the side portion 158 for a clamping bolt |
| 160 | top surface portion |

| | | |
|---|---|---|
| 160a | threaded bores in the top surface portion | |
| 162 | plurality of mounting slots | |
| 164 | motive power unit clamp assembly | |
| 164a | clamp knob | |
| 164b | adjusting screw | |
| 164c | wedge-shaped rubber clamp head | |
| 170 | 1-piece mount bracket for electric motive power unit | |
| 172 | mounting base portion | |
| 173 | elongate bore in the mounting base | |
| 174 | yoke for clamping screw | |
| 176 | downward-extending side portion | |
| 177 | profile in downward-extending side portion for engaging the motive power unit | |
| 178 | upward-extending curvilinear side portion | |
| 178a | bore in the side portion 158 for a clamping bolt | |
| 180 | top surface portion | |
| 180a | threaded bores in the top surface portion | |
| 182 | plurality of mounting slots | |
| 200 | variant of the 1-piece unit mount for the electric motive power unit | |
| 202 | mounting base | |
| 204 | yoke for clamping | |
| 204a | bore in yoke 204 | |
| 206 | downward-extending side portion | |
| 206a | bore in the downward side portion 186 for mounting screws to the electric motive power unit 110 | |
| 207 | profile in downward-extending side portion for engaging the motive power unit | |
| 208 | upward-extending curvilinear side portion | |
| 208a | bore in side portion 208 | |
| 210 | shortened top portion | |
| 210a | threaded bores in the top surface portion | |
| 212 | plurality of mounting slots | |
| 235 | 2-piece mount bracket for electric motive power unit | |
| 240 | lower mount bracket | |
| 242 | base of lower mount | |
| 244 | yoke for clamping bolt assembly | |
| 246 | downward-extending side portion | |
| 246a | bores in downward-extending side portion for mounting bolts | |
| 247 | profile in downward-extending side portion for engaging the motive power unit | |
| 248 | upward-extending side portion of the lower mount bracket | |
| 250 | upper mount bracket | |
| 250a | threaded bores | |
| 252 | upper mount bracket side arms | |
| 254 | plurality of mounting slots | |
| 255 | rear arm of the upper mount bracket | |
| 256 | through-slot formed by the rear arm of the upper mount bracket | |
| 257 | collar around the rear atm with a bore therethrough | |
| 260 | clamping bolt assembly |
| 260a | knob |
| 260b | adjusting screw |
| 260c | swivel head |
| 260d | rubber gasket |
| 265 | clamping bolt assembly for the upper mount bracket |
| 265a | knob |
| 265b | adjusting screw |
| 265c | swivel head |
| 265d | rubber gasket |
| 300 | quick-release throttle control assembly |
| 302 | throttle base |
| 304 | throttle base front hinge fingers |
| 304a | bores through the base front hinge fingers for receiving a hinge pin |
| 306 | throttle base rear upward-extending yokes |
| 306a | bores through the base rear hinge fingers for receiving a hinge pin |
| 308 | throttle top cover |
| 308a | rear-facing annular recess in the throttle top cover 308 |
| 308b | vertical channel from the rear edge of the throttle top cover 308 to about the center of the annular recess 308a |
| 309 | throttle top downward-extending hinge fingers |
| 310 | throttle base side covers |
| 311 | pegs extending outward from the throttle base side covers, for demountable engagement with the throttle tubular members 314 |
| 312 | tubular mount member extending from one base side cover (310a) for sliding engagement with the throttle actuator |
| 314 | tubular members provided along three side walls of the throttle base |
| 316 | bore in the floor of the throttle base |
| 318 | vertical slot in the front wall of the throttle base |
| 320 | throttle top |
| 322 | throttle top downward-extending rear hinge fingers |
| 322a | bores through the top rear hinge fingers for receiving a hinge pin |
| 324 | matching channels molded into the throttle based and top for demountably engaging a handlebar |
| 326 | reinforcing channels on throttle top |
| 328 | recess in the front face of the throttle top |
| 330 | upward-extending hinge fingers on the throttle top |
| 332 | recess at the rear of the throttle top |
| 334 | hinge pin for the rear of the throttle assembly |
| 336 | hinge pin for the front of the throttle assembly |
| 340 | throttle actuator for sliding engagement with the tubular mount member extending from one base side cover 312 |
| 342 | yoke on throttle lever |
| 344 | throttle thumb control |

-continued

| | |
|---|---|
| 344a | yokes extending downward from throttle thumb control |
| 344b | throttle thumb arm |
| 344c | bore through the distal end of the thumb throttle arm |
| 352 | Throttle shaft for connecting the thumb throttle with the throttle lever |
| 360 | quick-release cam lever for demountable engagement of the throttle base and the throttle top |
| 360a | cam lever pin |
| 360b | cam lever base |
| 362 | Quick-release nut interconnected to the quick-release cam lever 360 |
| 362a | side bore in quick-release nut for receiving a hinge pin |
| 362b | bore through the center of the quick-release nut for providing the cam movement in response to manipulation of the thumb throttle |
| 400 | bearing ring assembly |
| 410 | sprocket connection plate |
| 410a | inner surface of the sprocket connection plate |
| 410b | gap in the circumference of the sprocket connection plate |
| 410c | annular recesses on the inner surface of sprocket connection plate for seating the ends of the bearing rods |
| 410d | opposing notched recesses on the inner surface of the sprocket connection plate |
| 412 | teeth on the sprocket connection plate for engaging a front sprocket gear |
| 414 | spring clip for attaching the sprocket connect plate to a front sprocket assembly |
| 416 | spring clip pull tab |
| 418 | spring clip holder |
| 420 | roller bearings |
| 422 | bearing washers/spacers |
| 424 | bearing rods |
| 424a | ends of the bearing rods |
| 430 | bearing cover plate |
| 430a | inner surface of the bearing plate cover |
| 430b | gap in the circumference of the bearing cover plate |
| 430c | recesses on inner surface of bearing cover plate for seating the ends of the bearing rods |

The invention claimed is:

1. A kit of parts for providing electric motive power to a front sprocket assembly of a regular bicycle, the kit comprising:
an electric motive power unit having an external freewheeling sprocket drive assembly extending therefrom, said sprocket drive assembly configured for demountable engagement with a bicycle chain on the bicycle;
a rechargeable battery and battery mount for providing electric power to the electric motive power unit, said rechargeable battery and battery mount provided with a key for locking and unlocking the rechargeable battery to and from the battery mount;
a mount bracket for demountably engaging therein the electric motive power unit and for demountably engaging there onto the battery mount, said mount bracket configured for demountable engagement with a down tube element of the bicycle, said mount bracket configured to demountably engage to a top portion of the battery mount;
a power cable in communication with an on/off switch and a demountable handlebar clamp, said power cable demountably engageable with the rechargeable battery and battery mount;
a quick-release throttle control assembly configured for demountable engagement with the bicycle's handlebar, said throttle control assembly provided with a microprocessor configured to monitor and process signals received from a wheel sensor and to modulate electrical motive power outputs from the electric motive power unit in response to changes in the signals received from the wheel sensor; and
a communication cable configured for demountable engagement with the throttle control assembly, with the electric motive power unit, and with the wheel sensor,
wherein the mount bracket comprises a base surface portion, a side portion extending downward from a longitudinal side edge of the base surface portion, a side portion extending upward from an opposite longitudinal side edge of the base surface portion, and a top surface portion extending sideways from a top edge of the upwardly extending side portion.

2. The kit of parts of claim 1, wherein the microprocessor provided for the quick-release throttle control assembly is additionally configured to monitor and process signals received from one or both of a gear ratio sensor and a cadence sensor, and to further modulate electrical motive power outputs from the electric motive power unit in response to changes in the signals received from the wheel sensor, the gear ratio sensor and/or the cadence sensor.

3. The kit of parts of claim 1, additionally comprising a battery charger for recharging the rechargeable battery.

4. The kit of parts of claim 1, additionally comprising a hex-head wrench.

5. The kit of parts of claim 1, wherein the electric motive power unit comprises an electric motor contained within a motor housing and a gear drive assembly contained within a gear housing, wherein the gear housing is demountably engaged with the motor housing whereby a driveshaft of the electric motor is engaged with a proximal end of the gear drive assembly.

6. The kit of parts of claim 5 wherein a distal end of the gear drive assembly is engaged with a proximal end of the sprocket drive assembly.

7. The kit of parts of claim 5, wherein the sprocket drive assembly is configured to communicate and cooperate with an outermost sprocket gear of the bicycle's front sprocket assembly.

8. The kit of parts of claim 5, wherein the sprocket drive assembly is a two-stage sprocket assembly wherein the first stage is a sprocket gear configured to communicate and cooperate with the outermost sprocket gear of the bicycle's front sprocket assembly, and the second stage is an idler roller configured to communicate with the middle sprocket gear of the bicycle's front sprocket assembly.

9. The kit of parts of claim 1, wherein the upward-extending side portion has an elongate curvilinear profile.

10. The kit of parts of claim 1, wherein a longitudinal side edge of the top surface portion of the mount bracket is provided with a plurality of equidistantly spaced-apart slots extending thereinto, wherein selected pairs of the spaced-apart slots are configured for demountable engagement with a pair of threaded bores provided for engaging a water bottle cage along a top surface of the bicycle's down tube element.

11. The kit of parts of claim 1, wherein a rear-facing end edge of the downward-extending side portion is provided with a profile that matches a profile of a gear housing demountably engaged with a motor housing.

12. The kit of parts of claim 1, wherein the mount bracket is a two-piece mount bracket comprising a lower mount bracket and an upper mount bracket configured for sliding cooperation and engagement with the lower mount bracket.

13. The kit of parts of claim 12, wherein the lower mount bracket comprises the base surface portion, the side portion extending downward from the longitudinal side edge of the base surface portion, and the side portion extending upward from the opposite longitudinal side edge of the base surface portion.

14. The kit of parts of claim 1, wherein a rear-facing end edge of the downward-extending side portion of the lower mount bracket is provided with a profile that matches a profile of a gear housing demountably engaged with a motor housing.

15. The kit of parts of claim 12, wherein the upper mount bracket has a leading front end, a trailing back end, a rearward-facing side portion, a body portion, and a frontward-facing side portion,
- wherein the rearward-facing side portion is provided with an elongate arm integrally engaged at its ends with the leading front end and the trailing back end to thereby define a slot between the arm and the body portion, wherein the arm has a collar thereabout at a midpoint of the arm, said collar having a threaded bore therethrough for threadable communication with a clamping bolt assembly, and wherein said slot is configured for slidingly receiving therethrough the upward extending side portion of the lower mount bracket; and
- wherein the frontward-facing side portion is provided with a plurality of equidistantly spaced-apart slots extending thereinto, wherein selected pairs of the spaced-apart slots are configured for demountable engagement with a pair of threaded bores provided for engaging a water bottle cage along a top surface of the bicycle's down tube element.

16. The kit of parts of claim 1, wherein the quick-release throttle control assembly comprises a microprocessor for monitoring and processing a speed and an incline of the bicycle when in use, and for modulating or dampening the delivery of an electric motive power supply to the sprocket drive assembly in response to a processed speed or processed incline.

17. The kit of parts of claim 1, additionally comprising a bearing ring assembly configured for demountable engagement with an outer front sprocket gear of the bicycle's front sprocket assembly.

18. The kit of parts of claim 17, wherein the bearing ring assembly comprises a sprocket connection plate, a bearing cover plate, a plurality of equally spaced-apart roller bearings around a center access of the sprocket connection plate and the bearing cover plate, each of the roller bearings having a bearing rod therethrough, each of the bearing rods engaged at one end with an annular recess provided therefor in an inner surface of the sprocket connection plate and at the other end with an annular recess provided therefor in an inner surface of the bearing cover plate, wherein the sprocket connection plate has four equidistantly spaced-apart teeth extending perpendicularly from an outer rim of the sprocket connection plate for demountable engaging notches between sprocket teeth on the outer front sprocket gear, said bearing ring assembly demountably engageable with the outer front sprocket gear with a pair of opposing spring clip assemblies.

19. A kit of parts for providing electric motive power to a front sprocket assembly of a regular bicycle, the kit comprising:
- an electric motive power unit having an external freewheeling sprocket drive assembly extending therefrom, said sprocket drive assembly configured for demountable engagement with a bicycle chain on the bicycle;
- a rechargeable battery and battery mount for providing electric power to the electric motive power unit, said rechargeable battery and battery mount provided with a key for locking and unlocking the rechargeable battery to and from the battery mount;
- a mount bracket for demountably engaging therein the electric motive power unit and for demountably engaging there onto the battery mount, said mount bracket configured for demountable engagement with a down tube element of the bicycle, said mount bracket configured to demountably engage to a top portion of the battery mount;
- a power cable in communication with an on/off switch and a demountable handlebar clamp, said power cable demountably engageable with the rechargeable battery and the battery mount;
- a quick-release throttle control assembly configured for demountable engagement with the bicycle's handlebar, said throttle control assembly provided with a microprocessor configured to monitor and process signals received from a wheel sensor and to modulate electrical motive power outputs from the electric motive power unit in response to changes in the signals received from the wheel sensor; and
- a communication cable configured for demountable engagement with the throttle control assembly, with the electric motive power unit, and with the wheel sensor,
- wherein the microprocessor provided for the throttle control assembly is additionally configured to monitor and process signals received from one or both of a gear ratio sensor and a cadence sensor, and to further modulate electrical motive power outputs from the electric motive power unit in response to changes in the signals received from the wheel sensor, the gear ratio sensor and/or the cadence sensor.

20. A kit of parts for providing electric motive power to a front sprocket assembly of a regular bicycle, the kit comprising:
- an electric motive power unit having an external freewheeling sprocket drive assembly extending therefrom, said sprocket drive assembly configured for demountable engagement with a bicycle chain on the bicycle;
- a rechargeable battery and battery mount for providing electric power to the electric motive power unit, said rechargeable battery and battery mount provided with a key for locking and unlocking the rechargeable battery to and from the battery mount;
- a mount bracket for demountably engaging therein the electric motive power unit and for demountably engaging there onto the battery mount, said mount bracket configured for demountable engagement with a down tube element of the bicycle, said mount bracket configured to demountably engage to a top portion of the battery mount;

a power cable in communication with an on/off switch and a demountable handlebar clamp, said power cable demountably engageable with the rechargeable battery and battery mount;

a quick-release throttle control assembly configured for demountable engagement with the bicycle's handlebar, said throttle control assembly provided with a microprocessor configured to monitor and process signals received from a wheel sensor and to modulate electrical motive power outputs from the electric motive power unit in response to changes in the signals received from the wheel sensor; and a communication cable configured for demountable engagement with the throttle control assembly, with the electric motive power unit, and with the wheel sensor, wherein the electric motive power unit comprises an electric motor contained within a motor housing and a gear drive assembly contained within a gear housing, wherein the gear housing is demountably engaged with the motor housing whereby a driveshaft of the electric motor is engaged with a proximal end of the gear drive assembly.

21. A kit of parts for providing electric motive power to a front sprocket assembly of a regular bicycle, the kit comprising:

an electric motive power unit having an external freewheeling sprocket drive assembly extending therefrom, said sprocket drive assembly configured for demountable engagement with a bicycle chain on the bicycle;

a rechargeable battery and battery mount for providing electric power to the electric motive power unit, said rechargeable battery and battery mount provided with a key for locking and unlocking the rechargeable battery to and from the battery mount;

a mount bracket for demountably engaging therein the electric motive power unit and for demountably engaging there onto the battery mount, said mount bracket configured for demountable engagement with a down tube element of the bicycle, said mount bracket configured to demountably engage to a top portion of the battery mount;

a power cable in communication with an on/off switch and a demountable handlebar clamp, said power cable demountably engageable with the rechargeable battery and battery mount;

a quick-release throttle control assembly configured for demountable engagement with the bicycle's handlebar, said throttle control assembly provided with a microprocessor configured to monitor and process signals received from a wheel sensor and to modulate electrical motive power outputs from the electric motive power unit in response to changes in the signals received from the wheel sensor; and a communication cable configured for demountable engagement with the throttle control assembly, with the electric motive power unit, and with the wheel sensor, wherein the mount bracket is a two-piece mount bracket comprising a lower mount bracket and an upper mount bracket configured for sliding cooperation and engagement with the lower mount bracket.

* * * * *